(12) United States Patent
Matsushita

(10) Patent No.: US 9,857,221 B2
(45) Date of Patent: Jan. 2, 2018

(54) SPECTRAL IMAGE ACQUISITION APPARATUS AND LIGHT RECEPTION WAVELENGTH ACQUISITION METHOD

(71) Applicant: Seiko Epson Corporation, Tokyo (JP)

(72) Inventor: Tomonori Matsushita, Chino (JP)

(73) Assignee: Seiko Epson Corporation (JP)

( * ) Notice: Subject to any disclaimer, the term of this patent is extended or adjusted under 35 U.S.C. 154(b) by 38 days.

(21) Appl. No.: 14/813,472

(22) Filed: Jul. 30, 2015

(65) Prior Publication Data

US 2016/0037141 A1    Feb. 4, 2016

(30) Foreign Application Priority Data

Jul. 31, 2014    (JP) ................................. 2014-156542

(51) Int. Cl.
| | |
|---|---|
| *G01J 3/00* | (2006.01) |
| *G01J 3/02* | (2006.01) |
| *G01J 3/26* | (2006.01) |
| *G01J 3/28* | (2006.01) |

(52) U.S. Cl.
CPC ........... *G01J 3/0213* (2013.01); *G01J 3/0256* (2013.01); *G01J 3/26* (2013.01); *G01J 2003/2813* (2013.01); *G01J 2003/2826* (2013.01)

(58) Field of Classification Search
CPC ...... H04N 9/04; G01J 3/28; G01J 3/45; G01J 3/26; G02B 26/00; G02B 5/284; H01L 41/22; H03H 3/04

See application file for complete search history.

(56) References Cited

U.S. PATENT DOCUMENTS

| | | |
|---|---|---|
| 5,225,888 A | 7/1993 | Selwyn et al. |
| 8,063,976 B2 | 11/2011 | Kita |
| 2008/0186566 A1 | 8/2008 | Johansen et al. |
| 2011/0013189 A1 | 1/2011 | Johansen et al. |
| 2011/0131774 A1* | 6/2011 | Miyake ..................... H03H 3/04 29/25.35 |
| 2012/0008141 A1* | 1/2012 | Matsushita ............ G02B 5/284 356/326 |
| 2012/0120403 A1* | 5/2012 | Funamoto ................. G01J 3/26 356/451 |
| 2012/0133947 A1 | 5/2012 | Nozawa |

(Continued)

FOREIGN PATENT DOCUMENTS

| | | |
|---|---|---|
| JP | 04-125429 A | 4/1992 |
| JP | 04-303745 A | 10/1992 |

(Continued)

*Primary Examiner* — Jamil Ahmed
(74) *Attorney, Agent, or Firm* — Harness, Dickey & Pierce, P.L.C.

(57) ABSTRACT

A spectral camera includes a wavelength variable interference filter, an imaging unit having a plurality of light receiving elements arranged in a two-dimensional array configuration, and a wavelength acquisition unit which acquires center wavelengths of light beams received by the light receiving elements in accordance with signal values output from the light receiving elements when reference light is received by the imaging unit. Light amounts of the reference light corresponding to different wavelength components in a certain wavelength range are uniform in a plane, and different signal values are acquired when light beams of the different wavelength components are received by the light receiving elements.

13 Claims, 19 Drawing Sheets

(56) References Cited

U.S. PATENT DOCUMENTS

| | | | |
|---|---|---|---|
| 2012/0293803 A1 | 11/2012 | Arai | |
| 2013/0002825 A1* | 1/2013 | Ishii | G03B 35/08 348/46 |
| 2014/0084069 A1* | 3/2014 | Mizukoshi | G06K 7/12 235/468 |
| 2014/0176729 A1 | 6/2014 | Saari et al. | |

FOREIGN PATENT DOCUMENTS

| | | | |
|---|---|---|---|
| JP | 11-304588 | A | 11/1999 |
| JP | 2000-039360 | A | 2/2000 |
| JP | 2005-195474 | A | 7/2005 |
| JP | 2008-537802 | A | 9/2008 |
| JP | 2009-033222 | A | 2/2009 |
| JP | 2009-168597 | A | 7/2009 |
| JP | 2010-032867 | A | 2/2010 |
| JP | 2010-286291 | A | 12/2010 |
| JP | 2012-063239 | A | 3/2012 |
| JP | 2012-113133 | A | 6/2012 |
| JP | 2012-127917 | A | 7/2012 |
| JP | 2012-242271 | A | 12/2012 |
| JP | 2013-083685 | A | 5/2013 |
| JP | 2013-088263 | A | 5/2013 |
| JP | 2013-109055 | A | 6/2013 |
| JP | 2013-170867 | A | 9/2013 |
| JP | 2014-077792 | A | 5/2014 |

* cited by examiner

SPECTRAL IMAGE ACQUISITION APPARATUS AND LIGHT RECEPTION WAVELENGTH ACQUISITION METHOD

BACKGROUND

1. Technical Field

The present invention relates to a spectral image acquisition apparatus and a light reception wavelength acquisition method employed in the spectral image acquisition apparatus.

2. Related Art

In general, apparatuses which receive incident light by Fabry-Perot etalon (an interference filter) having a pair of reflection films which face each other, perform plane spectroscopy using the interference filter on light having a wavelength based on a dimension of a gap between the reflection films, and perform imaging using a camera have been used (refer to JP-A-4-125429, for example).

The apparatus disclosed in JP-A-4-125429 may change a wavelength of light to be subjected to plane spectroscopy by changing an inclination angle of the interference filter having the reflection films facing each other and perform imaging using the light having the wavelength which has been subjected to the plane spectroscopy so as to obtain a spectral image.

The interference filter changes a wavelength of transmission light in accordance with the dimension of the gap between the reflection films. However, it is difficult to uniformly form the dimension of the gap between the reflection films in fabrication of the interference filter, and therefore, in-plane variation occurs in the dimension of the gap between the reflection films due to a fabrication error or the like in practice. Such in-plane variation is not taken into consideration in JP-A-4-125429, and therefore, light transmitted through the interference filter has different transmission wavelengths in different portions, that is, wavelengths of light beams obtained by the plane spectroscopy are not uniform (or in-plane unevenness occurs).

When such in-plane unevenness occurs, light beams having different wavelengths are received by light receiving elements included in the camera, and accordingly, a spectral image having a target wavelength may not be obtained with high accuracy.

SUMMARY

An advantage of some aspects of the invention is to provide a spectral image acquisition apparatus capable of acquiring a spectral image with high accuracy and a light reception wavelength acquisition method employed in the spectral image acquisition apparatus.

A spectral image acquisition apparatus according to a first aspect of the present invention includes a spectral filter configured to allow light beams of incident light having predetermined wavelengths to be transmitted, an imaging unit configured to have a plurality of light receiving elements and receive light beams divided by the spectral filter, and a wavelength acquisition unit configured to acquire center wavelengths of the light beams individually incident on the plurality of light receiving elements in accordance with signal values output from the plurality of light receiving elements when the light is received by the imaging unit. Light amounts of a plurality of wavelength components in a certain wavelength range included in the reference light are substantially uniform in a plane which intersects with a light axis of the reference light. Different signal values are output from the light receiving elements when light beams of the plurality of wavelength components in the certain wavelength range of the reference light are received by the imaging unit depending on the wavelength components.

Furthermore, a spectral image acquisition apparatus according to an application example of the invention includes a spectral filter configured to emit light having a certain wavelength selected from incident light and an imaging unit configured to have a plurality of light receiving elements arranged in a two-dimensional array configuration and receive light beams divided by the spectral filter, and a wavelength acquisition unit configured to acquire center wavelengths of the light beams individually incident on the plurality of light receiving elements in accordance with signal values output from the light receiving elements when the reference light is received by the imaging unit. Light amounts corresponding to a plurality of wavelength components in a certain wavelength range included in the reference light are substantially uniform in a plane which intersects with a light axis of the reference light. Different signal values are output from the light receiving elements when light beams of the plurality of wavelength components in the certain wavelength range of the reference light are received by the imaging unit depending on the wavelength components.

In this application example, the wavelength acquisition unit receives the reference light reflected or transmitted by the spectral filter through the imaging unit and acquires center wavelengths of light beams received by the light receiving elements in accordance with signal values output from the light receiving elements of the imaging unit.

Here, the reference light of this example has uniform light amounts in a plane for different wavelengths, and values of the light amounts are not changed depending on an incident position when the reference light is incident on the spectral filter. For example, a light amount of light having a wavelength of $\lambda 1$ included in the reference light is A irrespective of a position of incident light in the spectral filter. In this case, when unevenness of wavelength of divided light beams does not occur (in-plane unevenness does not occur) in a light incident region of the spectral filter, if light having a wavelength of $\lambda 1$ is transmitted through the spectral filter, the light receiving elements in the imaging unit output signal values corresponding to the light amount A.

Furthermore, in this application example, different signal values are output from the light receiving elements for different wavelength components when the reference light is received by the light receiving elements. Specifically, signal values acquired when the light of the wavelength of $\lambda 1$ is received by the light receiving elements are different from signal values acquired when the light of the wavelength of $\lambda 2$ is received by the light receiving elements.

With this configuration, when the reference light emitted (transmitted or reflected) by the spectral filter is received by the light receiving elements, signal values corresponding to center wavelengths of the received light beams are output. Accordingly, signal values to be output from the light receiving elements which correspond to the different wavelength components of the reference light having a certain light amount are measured in advance so that the wavelength acquisition unit may easily acquire center wavelengths of light beams received by the light receiving element with high accuracy.

As described above, since the center wavelengths of the light beams received by the light receiving elements are acquired, wavelength distribution in a captured image may be determined, and a spectral image may be captured with high accuracy by performing wavelength correction. For example, a wavelength of light emitted from the spectral filter is successively changed so that light having a target wavelength may be received by the light receiving elements, amounts of light beams having the target wavelength in the light receiving elements are detected, and thereafter, the light amounts are synthesized with one another. In this way, a spectral image having the target wavelength may be acquired.

It is preferable that the spectral image acquisition apparatus of this application example includes a fixed filter configured to be disposed on a light path of light incident on the imaging unit and to have different transmittances for the different wavelength components in the certain wavelength range.

In this example, light which is transmitted through the fixed filter having different transmittance characteristics for the different wavelength components and a spectral filter may be received by the imaging unit.

For example, in a case where wavelength characteristics of the reference light are substantially uniform (light amounts of different wavelengths are uniform), in a case where sensitivity characteristics of the light receiving elements relative to wavelengths are substantially uniform, or in a case where the fixed filter is not provided, signal values output from the light receiving elements become similar to one another among individual wavelength components, and accordingly, it may be difficult to determine center wavelengths of the received light beams. On the other hand, since the fixed filter described above is used in this embodiment, different signal values are output from the light receiving elements depending on wavelength components. Accordingly, center wavelengths of light beams received by the light receiving elements may be acquired with higher accuracy.

It is preferable that the spectral image acquisition apparatus of this application example includes a light source which emits the reference light. It is preferable that the light source emits light beams having different light amounts depending on the different wavelength components in the certain wavelength range.

In this example, different light amounts are acquired for different wavelengths of the reference light emitted from the light source.

For example, in a case where the wavelength characteristics of the reference light is substantially uniform (light amounts of different wavelengths are uniform) or in a case where the sensitivity characteristics of the light receiving elements relative to wavelengths are substantially uniform, signal values output from the light receiving elements become similar to one another among individual wavelength components, and accordingly, it may be difficult to determine center wavelengths of the received light beams. On the other hand, since different light amounts are acquired for different wavelengths of light beams emitted from the light source in this application example, different signal values are output from the light receiving elements depending on the wavelength components. In this case, different signal values are output from the light receiving elements when the reference light is received without using the fixed filter unlike the application example described above, and accordingly, center wavelengths of light beams received by the light receiving elements may be acquired with high accuracy.

Furthermore, even when the fixed filter is used as described in the application example above, characteristics of the light source and the fixed filter are set such that different light amounts are acquired for different wavelength components when the wavelength characteristics of the reference light emitted from the light source are multiplied by a transmittance characteristic of the fixed filter.

It is preferable that, in the spectral image acquisition apparatus of this application example, the plurality of light receiving elements in the imaging unit have different sensitivity characteristics for the different wavelength components in the certain wavelength range.

In this application example, different sensitivities of the light receiving elements in the imaging unit are obtained for different wavelengths.

For example, in a case where the wavelength characteristics of the reference light is substantially uniform (light amounts of different wavelengths are uniform) or in a case where the sensitivity characteristics of the light receiving elements relative to wavelengths are substantially uniform, signal values become similar to one another for individual wavelength components, and accordingly, it may be difficult to determine center wavelengths of the received light beams. On the other hand, since different sensitivities of the light receiving elements are acquired for different wavelengths as described above in this application example, different signal values are output from the light receiving elements depending on wavelength components even if light amounts of the different wavelength components in the reference light are substantially uniform. Also in this case, different signal values are output from the light receiving elements when the reference light is received without using the fixed filter unlike the application example described above, and accordingly, center wavelengths of light beams received by the light receiving elements may be acquired with high accuracy.

Furthermore, the fixed filter may be used as described in the application example described above, and light amounts of the reference light may be differentiated depending on the wavelength components. In this case, characteristics of the light source, the fixed filter, and the light receiving elements are set such that different signal values are output from the light receiving elements for different wavelength components when the transmittance characteristic of the fixed filter, the wavelength characteristics of the reference light emitted from the light source, and the sensitivity characteristics of the light receiving elements are multiplied by one another.

It is preferable that, in the spectral image acquisition apparatus of this application example, signal values output from the light receiving elements when the plurality of wavelength components in the certain wavelength range of the reference light are received by the imaging unit monotonically change relative to wavelengths.

In this application example, signal values output from the light receiving elements relative to the wavelength components when the reference light is received by the imaging unit monotonically change in accordance with change of a wavelength.

Specifically, the wavelength characteristics of the reference light, the sensitivity characteristics of the light receiving elements, and the transmittance characteristic of the fixed filter are set such that the signal values output from the light receiving elements monotonically increase or monotonically decrease when wavelengths included in the certain wavelength range of the reference light is successively switched and light beams having the wavelengths are individually received by the light receiving elements.

In this case, when the reference light is received by the light receiving elements through the spectral filter, one wavelength is determined for one signal value, and center wavelengths of the light beams received by the light receiving element may be specified with higher accuracy. Furthermore, since the signal values monotonically change in accordance with the wavelength change, center wavelengths of the light beams received by the light receiving elements may be easily calculated from signal values output after a complementary process or the like is performed, for example.

It is preferable that the spectral image acquisition apparatus of this application example further includes a fixed filter disposed on a light path of light incident on the imaging unit and formed by laminating Ag and $Al_2O_3$ on a glass substrate.

In this example, when a signal value is monotonically changed in accordance with wavelength change using a fixed filter separately provided, a filter formed by laminating Ag and $Al_2O_3$ on a glass substrate is used as the fixed filter.

In such a fixed filter, a transmittance characteristic is monotonically reduced when a wavelength is monotonically increased. Accordingly, even in a case where it is difficult to set the wavelength characteristics of the light source which output the reference light and the sensitivity characteristics of the light receiving elements, the signal characteristics of the light receiving elements when the reference light is received by the light receiving elements may be monotonically increased relative to the wavelengths.

It is preferable that, in the spectral image acquisition apparatus of this application example, the spectral filter is capable of changing a wavelength of emission light. It is preferable that the spectral image acquisition apparatus further includes a measurement controller configured to successively change a wavelength of light emitted from the spectral filter, and an image generation unit configured to generate, in accordance with light amounts of light beams having substantially the same wavelengths received by the plurality of light receiving elements, a spectral image corresponding to the wavelengths.

In this application example, a wavelength of the light emitted from the spectral filter is successively changed by the measurement controller and light amounts in the light receiving elements are acquired. In this case, a gap dimension is successively changed so that light amounts of pixels of a spectral image having a target wavelength are acquired. Then the image generation unit generates a spectral image in accordance with the light amounts of the light beams having the target wavelength received by the light receiving elements. By this, a spectral image including pixels having pixel values (luminance values, for example) corresponding to the light amounts of the light beams having the desired target wavelength may be generated.

It is preferable that the spectral image acquisition apparatus of this application example further includes a spectrum measurement unit configured to measure spectral spectra of the light beams received by the plurality of light receiving elements.

In the invention, the spectral spectra of the light beams received by the light receiving elements are measured in accordance with the amounts of the light beams received by the light receiving elements relative to the wavelengths by successively changing a wavelength of light emitted from the spectral filter. With this configuration, the spectral spectra in the pixels corresponding to the light receiving elements may be acquired with high accuracy.

It is preferable that, in the spectral image acquisition apparatus of this application example, the image generation unit acquires amounts of light beams having substantially the same wavelengths received by the plurality of light receiving elements in accordance with the spectral spectra of the light beams received by the plurality of light receiving elements and generate a spectral image corresponding to the wavelengths.

In this application example, a spectral image is generated in accordance with the spectral spectra in the pixels corresponding to the light receiving elements which are measured as described above. Specifically, light amounts of a desired target wavelength are detected from the spectral spectra of the pixels and a spectral image having the target wavelength is generated in accordance with the light amounts. In this case, when a plurality of spectral images are acquired (that is, a plurality of target wavelengths are set) or when a target wavelength is set after an imaging operation is performed, a spectral image having a desired target wavelength or spectral images having a plurality of desired target wavelengths may be acquired with ease without repetitively performing the imaging operation.

It is preferable that the spectral image acquisition apparatus of this application example further includes an incident angle acquisition unit configured to acquire incident angles of the light beams incident on the plurality of light receiving elements in accordance with center wavelengths of the light beams received by the plurality of light receiving elements acquired by the wavelength acquisition unit.

In this application example, the incident angles of the light beams incident on the light receiving elements are acquired in accordance with center wavelengths of the light beams received by the light receiving elements acquired by the wavelength acquisition unit. Specifically, in the application example of the invention described above, the light beams received by the light receiving elements include in-plane variation of the spectral filter and variation in incident angles, and wavelengths of the received light beams may be finally determined taking the in-plane variation and the variation in incident angles into consideration. Accordingly, for example, after center wavelengths are specified from signal values obtained when the reference light beams which are parallel to one another are received by the light receiving elements taking the in-plane variation into consideration, a measurement is performed using an incident optical system or the like so that wavelength shift amounts are determined. In this way, variation in incident angles in the incident optical system may be measured.

A spectral measurement apparatus having such a configuration may be employed in examination of variation in incident angles of lenses included in the incident optical system, for example.

It is preferable that, in the spectral image acquisition apparatus of this application example, the spectral filter is a wavelength variable interference filter including a pair of reflection films which face each other and a gap changing unit which changes a dimension of a gap between the pair of reflection films.

In this application example, a wavelength variable interference filter is used as the spectral filter. Such a wavelength variable interference filter may be made thinner or may be miniaturized when compared with spectral filters including AOTFs (Acousto-Optic Tunable Filters) and LCTFs (Liquid Crystal Tunable Filters). Accordingly, the spectral image acquisition apparatus may be miniaturized.

A light reception wavelength acquisition method according to a second aspect of the invention is employed in a spectral image acquisition apparatus including a spectral filter which allows light beams of incident light having predetermined wavelengths to be transmitted and is capable of changing the predetermined wavelengths and an imaging unit which has a plurality of light receiving elements and receives light beams divided by the spectral filter. The light reception wavelength acquisition method includes causing the imaging unit to receive reference light through the spectral filter, and acquiring center wavelengths of the light beams individually incident on the plurality of light receiving elements in accordance with signal values output from the plurality of light receiving elements when the light is received by the imaging unit. Light amounts of a plurality of wavelength components in a certain wavelength range included in the reference light are substantially uniform in a plane which intersects with a light axis of the reference light. Different signal values are output from the light receiving elements when light beams of the plurality of wavelength components in the certain wavelength range of the reference light are received by the imaging unit through the spectral filter depending on the wavelength components.

Furthermore, a light reception wavelength acquisition method according to another application example of the invention is employed in a spectral image acquisition apparatus including a spectral filter which is capable of selecting light beams having predetermined wavelengths from incident light and emitting the light beams and which is capable of changing the predetermined wavelengths and an imaging unit which has a plurality of light receiving elements arranged in a two-dimensional array configuration and receives light beams divided by the spectral filter. The light reception wavelength acquisition method includes causing the imaging unit to receive reference light through the spectral filter, and acquiring center wavelengths of the light beams incident on the plurality of light receiving elements in accordance with signal values output from the light receiving elements when the light is received by the imaging unit. As for the reference light, light amounts of a plurality of wavelength components in a certain wavelength range included in the reference light are uniform in a plane which intersects with a light axis of the reference light. Different signal values are output from the light receiving elements when light beams of the plurality of wavelength components in the certain wavelength range of the reference light are received by the imaging unit without using the spectral filter depending on the wavelength components.

In this application example, the imaging unit receives the reference light reflected or transmitted by the spectral filter and acquires center wavelengths of light beams received by the light receiving elements in accordance with signal values output from the light receiving elements of the imaging unit. Here, as with the foregoing application example, light amounts of the reference light corresponding to different wavelength components are uniform in a plane, and values of the light amounts are not changed depending on an incident position when the reference light is incident on the spectral filter. Furthermore, different signal values are output from the light receiving elements when the reference light is received by the light receiving elements depending on different wavelength components.

Accordingly, when the reference light emitted (transmitted or reflected) by the spectral filter is received by the light receiving elements, signal values corresponding to the center wavelengths of the received light beams are output. Consequently, when the signal values output from the light receiving elements are measured in advance, the center wavelengths of the light beams received by the light receiving elements may be easily acquired with high accuracy.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

A first embodiment of the invention will be described hereinafter with reference to the accompanying drawings.
Schematic Configuration of Spectral Camera FIG. 1 is a diagram schematically illustrating a configuration of a spectral camera 1 according to a first embodiment of the invention.

The spectral camera 1 corresponding to a spectral image acquisition apparatus of the invention captures a spectral image of a target of imaging.

Figure 1:
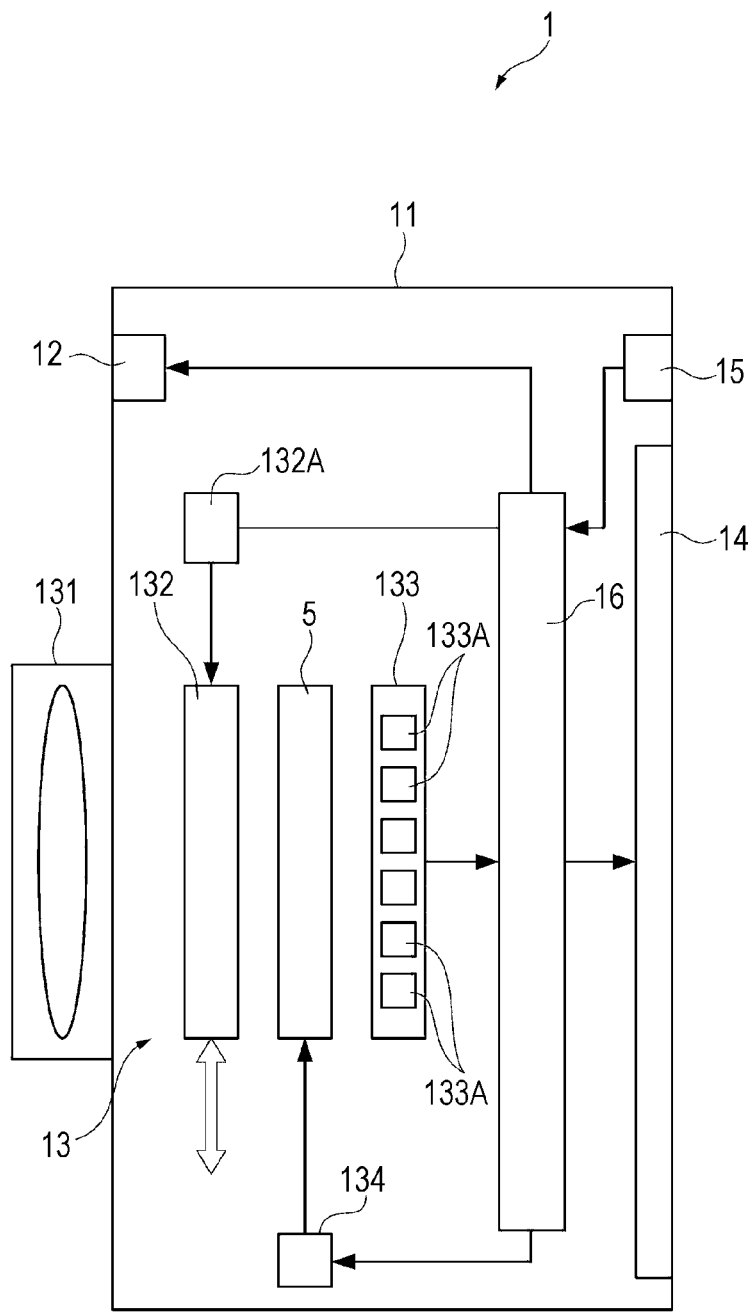
FIG. 1 is a diagram schematically illustrating a configuration of a spectral camera according to a first embodiment of the invention.

As illustrated in FIG. 1, the spectral camera 1 includes a light source unit 12, an imaging module 13, a display 14, an operation unit 15, and a controller 16 which are accommodated in an outer casing 11. Examples of the spectral camera 1 include various general devices, such as a smartphone, a tablet terminal, and a digital still camera, having a camera function.

Configuration of Light Source Unit

The light source unit 12 irradiates light on a measurement target.

In this embodiment, reference light emitted from the light source unit 12 is reflected by a reference plate (a white plate, for example) having a predetermined reflectance. In accordance with a signal value output from the imaging module 13 when imaging is performed using the reflection light by the imaging module 13, a center wavelength of the received light is acquired. In this embodiment, for simplicity of description, a case where light amounts of the reference light corresponding to different wavelength components in a certain wavelength range which is a target of acquisition of a spectral image (hereinafter referred to as a "spectral wavelength range") are uniform or substantially uniform, that is, in-plane variation of the light amounts does not occur, will be described as an example.

Configuration of Imaging Module

The imaging module 13 obtains an image by receiving incident light. The imaging module 13 includes an incident optical system 131, a fixed filter 132, a wavelength variable interference filter 5 corresponding to a spectral filter of the invention, an imaging unit 133, and a filter driving circuit 134.

Configuration of Incident Optical System

The incident optical system 131 forms an image (an image of a target object) on the imaging unit 133 using light incident through an incident window formed on the outer casing 11. Examples of the incident optical system 131 include a telecentric optical system which guides incident light such that a main light axis of the light is in parallel to the wavelength variable interference filter 5.

Configuration of Fixed Filter

The fixed filter 132 has a predetermined transmittance characteristic and allows an amount of light based on the transmittance characteristic to be transmitted.

Figure 2:
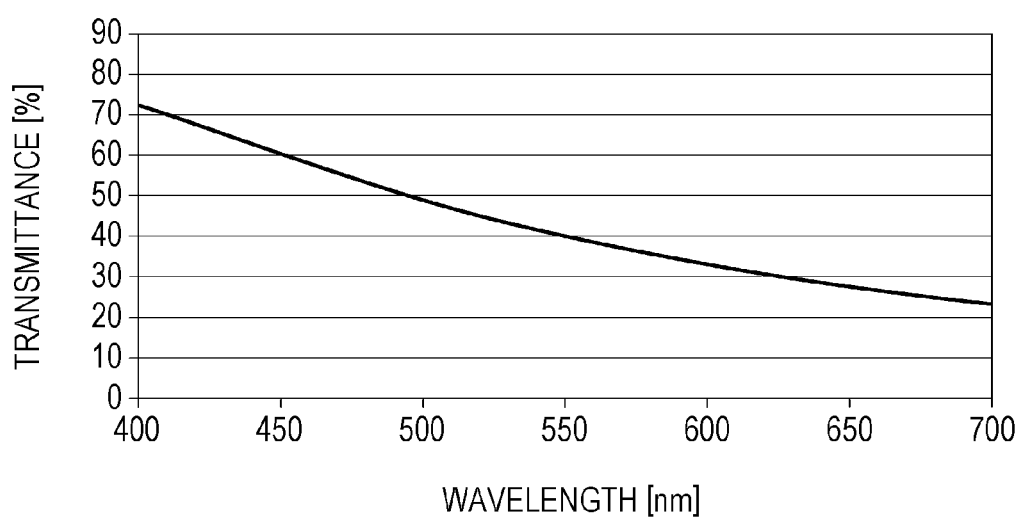
FIG. 2 is a graph illustrating a transmittance characteristic of a fixed filter according to the first embodiment.

FIG. 2 is a graph illustrating the transmittance characteristic of the fixed filter 132 according to this embodiment.

As illustrated in FIG. 2, the fixed filter 132 of this embodiment has different transmittance characteristics for different wavelength components in the spectral wavelength range. More specifically, the fixed filter 132 has a transmittance characteristic in which a transmittance is monotonically reduced in a wavelength increasing direction. The fixed filter 132 may be easily fabricated as a laminated body configured by laminating an Ag film of 20 nm and $Al_2O_3$ of 20 nm on a glass substrate, for example.

Furthermore, the fixed filter 132 has a sliding mechanism 132A. The sliding mechanism 132A is driven under control of the controller 16 and slides the fixed filter 132 on a path of light incident from the incident optical system 131. Specifically, the sliding mechanism 132A moves the fixed filter 132 onto the light path when center wavelengths of the light beams received by light receiving elements 133A included in the imaging unit 133 are to be specified whereas the sliding mechanism 132A retracts the fixed filter 132 from the light path when a spectral image of an imaging target is to be captured.

Configuration of Imaging Unit

As the imaging unit 133, an image sensor, such as a CCD (Charge-Coupled Device) sensor or a CMOS (Complementary Metal-Oxide Semiconductor) sensor, may be used. The imaging unit 133 has a two-dimensional array configuration in which the light receiving elements 133A corresponding to pixels of a captured image are arranged in a matrix. Each of the light receiving elements 133A outputs a signal value corresponding to an amount of received light to the controller 16.

Note that, in this embodiment, for simplicity of description, sensitivities of the light receiving elements 133A are uniform and sensitivities relative to the wavelength components in the spectral wavelength range are also uniform.

Configuration of Wavelength Variable Interference Filter

Figure 3:
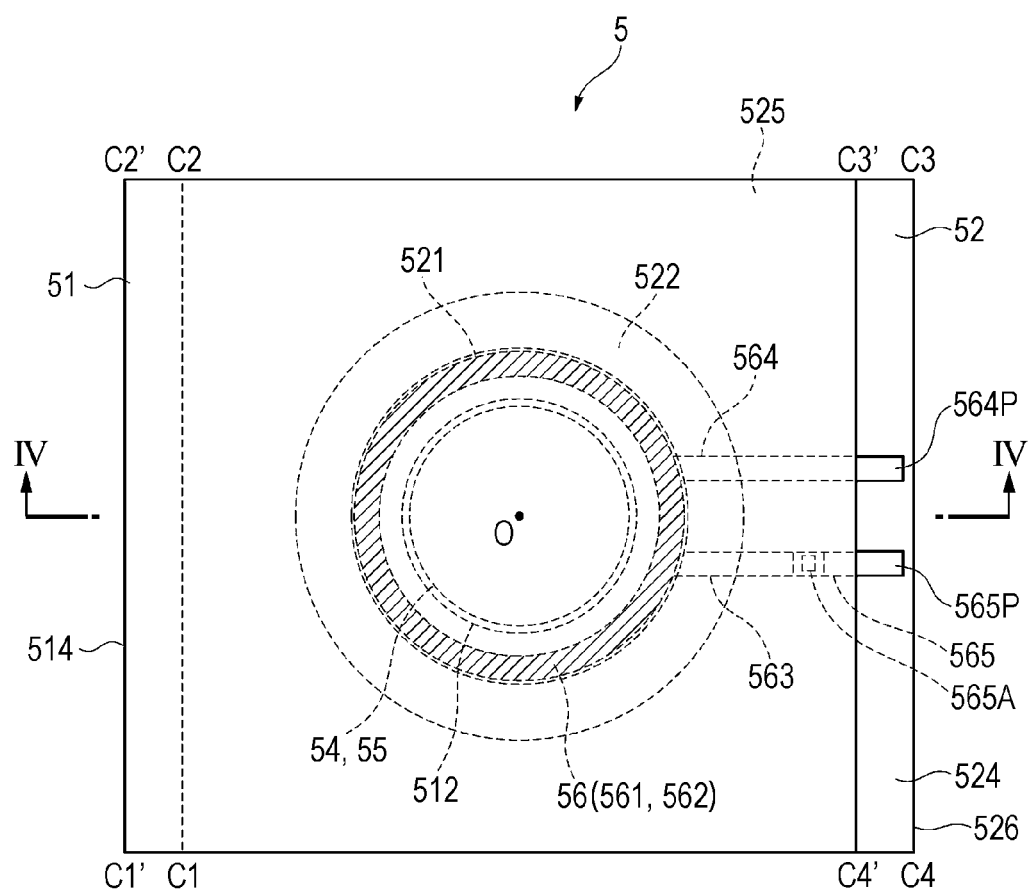
FIG. 3 is a plan view schematically illustrating a wavelength variable interference filter according to the first embodiment.
Figure 4:
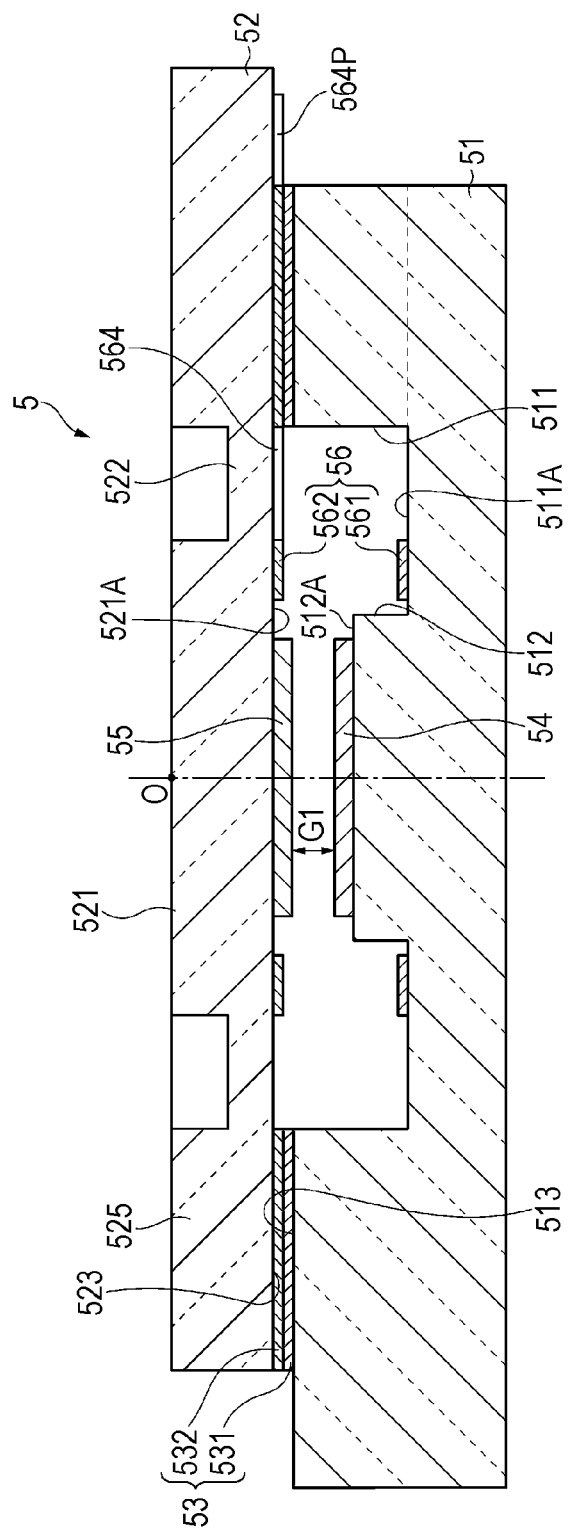
FIG. 4 is a cross-sectional schematic view taken along a line IV-IV on the wavelength variable interference filter in FIG. 3.

FIG. 3 is a plan view schematically illustrating the wavelength variable interference filter 5. FIG. 4 is a cross-sectional view schematically illustrating a configuration of the wavelength variable interference filter 5 taken along a line IV-IV of FIG. 3.

The wavelength variable interference filter 5 includes a fixed substrate 51 and a movable substrate 52 as illustrated in FIGS. 3 and 4. The fixed substrate 51 and the movable substrate 52 are formed of one of various types of glass, crystals, and the like, and in this embodiment, the fixed substrate 51 and the movable substrate 52 are formed of quartz glass. The fixed substrate 51 and the movable substrate 52 are coupled with each other by a coupling film 53 (including first and second coupling films 531 and 532) so as to be integrally configured as illustrated in FIG. 4. Specifically, a first coupling portion 513 of the fixed substrate 51 and a second coupling portion 523 of the movable substrate 52 are coupled with each other by the coupling film 53 formed of a plasma polymerized film including siloxane as a main component, for example.

Note that a plan view from a direction of a thickness of the fixed substrate 51 or the movable substrate 52, that is, a plan view obtained by viewing the wavelength variable interference filter 5 in a direction of lamination of the fixed substrate 51, the coupling film 53, and the movable substrate 52 is referred to as a "filter plan view".

The fixed substrate 51 includes a fixed reflection film 54 which corresponds to one of a pair of reflection films of the invention as illustrated in FIG. 4. Furthermore, the movable substrate 52 includes a movable reflection film 55 which corresponds to the other of the pair of reflection films of the invention. The fixed reflection film 54 and the movable reflection film 55 face each other through a reflection film gap G1.

The wavelength variable interference filter 5 includes an electrostatic actuator 56 serving as a gap changing unit of the invention used for controlling a width of the gap G1 (gap dimension) between the reflection films 54 and 55. The electrostatic actuator 56 includes a fixed electrode 561 disposed on the fixed substrate 51 and a movable electrode 562 disposed on the movable substrate 52. The electrodes 561 and 562 face each other. The fixed electrode 561 and the movable electrode 562 face each other through an electrode gap. The electrodes 561 and 562 may be directly disposed on surfaces of the fixed substrate 51 and the movable substrate 52, respectively, or may be disposed through respective certain film members.

Although the reflection film gap G1 is smaller than the electrode gap in this embodiment, the reflection film gap G1 may be larger than the electrode gap depending on a range of wavelengths which are allowed to be transmitted through the wavelength variable interference filter 5, for example.

Furthermore, in the filter plan view, one side of the movable substrate 52 (a side C3 to C4 in FIG. 3, for example) projects outward relative to a side C3' to C4' of the fixed substrate 51. A projected portion of the movable substrate 52 serves as an electric portion 526 which is not coupled with the fixed substrate 51. A surface of the wavelength variable interference filter 5 which is exposed when the wavelength variable interference filter 5 is viewed from the fixed substrate 51 serves as an electric surface 524 including electrode pads 564P and 565P disposed thereon which will be described below.

Similarly, in the filter plan view, one side of the fixed substrate 51 (which is an opposite side relative to the electric portion 526) projects outward relative to the movable substrate 52.

Configuration of Fixed Substrate

The fixed substrate 51 includes an electrode arrangement groove 511 and a reflection film arrangement portion 512 which are formed by etching. The fixed substrate 51 has a thickness larger than that of the movable substrate 52. Accordingly, flexure of the fixed substrate 51 owing to electrostatic attractive force generated when a voltage is applied between the fixed electrode 561 and the movable electrode 562 or internal stress of the fixed electrode 561 does not occur.

The electrode arrangement groove 511 has a circle form having a center point O of the filter of the fixed substrate 51 as a center in the filter plan view. The reflection film arrangement portion 512 is projected toward the movable substrate 52 in a center portion of the electrode arrangement groove 511 in the filter plan view. A bottom surface of the electrode arrangement groove 511 serves as an electrode installation surface 511A on which the fixed electrode 561 is disposed. Furthermore, an end surface of the projection of the reflection film arrangement portion 512 serves as a reflection film installation surface 512A.

The fixed electrode 561 which is included in the electrostatic actuator 56 is disposed on the electrode installation surface 511A. The fixed electrode 561 is disposed in a region which faces the movable electrode 562 included in a movable portion 521 described below in the electrode installation surface 511A. Alternatively, an insulating film may be laminated on the fixed electrode 561 so that insulation between the fixed electrode 561 and the movable electrode 562 is ensured.

A fixed extraction electrode 563 connected to an outer circumferential edge of the fixed electrode 561 is disposed on the fixed substrate 51. The fixed extraction electrode 563 is disposed along a connection electrode groove (not illustrated) formed from the electrode arrangement groove 511 toward the side C3' to C4' (toward the electric portion 526). A bump portion 565A which projects toward the movable substrate 52 is disposed on the connection electrode groove, and the fixed extraction electrode 563 extends over the bump portion 565A. The fixed extraction electrode 563 abuts on a fixed connection electrode 565 disposed on the movable substrate 52 over the bump portion 565A so as to electrically connected to the fixed connection electrode 565. The fixed connection electrode 565 extends from a region facing the connection electrode groove to the electric surface 524 and forms the fixed electrode pad 565P on the electric surface 524.

Although only the single fixed electrode 561 is disposed on the electrode installation surface 511A in this embodiment, two electrodes having the filter center point O as centers may be disposed as concentric circles (double electrode configuration). Alternatively, a transparent electrode may be disposed on the fixed reflection film 54 or a conductive fixed reflection film 54 may be used and a connection electrode may be formed in a region from the fixed reflection film 54 to a fixed-side electric surface 514, and in this case, a portion of the fixed electrode 561 may be cut off depending on a position of the connection electrode.

The reflection film arrangement portion 512 has a substantially cylindrical shape which has a diameter smaller than that of the electrode arrangement groove 511 and which is coaxial with the electrode arrangement groove 511 as described above. In addition, the reflection film arrangement portion 512 has the reflection film installation surface 512A in a portion of the reflection film arrangement portion 512 which faces the movable substrate 52.

The fixed reflection film 54 is disposed on the reflection film arrangement portion 512 as illustrated in FIG. 4. As the fixed reflection film 54, a metal film, such as Ag, or an alloy film, such as Ag alloy, may be used, for example. Alternatively, a dielectric multi-layer having a high refractive layer of $TiO_2$ and a low refractive layer of $SiO_2$ may be used. Furthermore, a reflection film formed by laminating a metal film (or an alloy film) on a dielectric multi-layer, a reflection film formed by laminating a dielectric multi-layer on a metal film (or an alloy film), a reflection film formed by laminating a single refractive layer ($TiO_2$, $SiO_2$, or the like) and a metal film (or an ally film), or the like may be used.

Moreover, an antireflection film may be formed in a position corresponding to the fixed reflection film 54 on a light incident surface of the fixed substrate 51 (a surface which does not include the fixed reflection film 54). The antireflection film formed by laminating a low refractive film and a high refractive film may reduce reflectance and increase transmittance of visible light on the surface of the fixed substrate 51.

In the surface of the fixed substrate 51 which faces the movable substrate 52, a portion which does not include the electrode arrangement groove 511, the reflection film arrangement portion 512, and the connection electrode groove which are formed by etching serves as the first coupling portion 513. The first coupling film 531 is formed on the first coupling portion 513, and the fixed substrate is coupled with the movable substrate 52 as described above by coupling the first coupling film 531 with the second coupling film 532 disposed on the movable substrate 52.

Configuration of Movable Substrate

The movable substrate 52 includes the circular movable portion 521 having the filter center point O as a center and a holding unit 522 which is coaxial with the movable portion 521 and which holds the movable portion 521.

The movable portion 521 has a thickness larger than that of the holding unit 522. The movable portion 521 at least has a diameter larger than that of an outer circumference of the reflection film installation surface 512A in the filter plan view. The movable portion 521 includes the movable electrode 562 and the movable reflection film 55 disposed thereon.

As with the fixed substrate 51, an antireflection film may be formed on a surface of the movable portion 521 which is positioned opposite to the fixed substrate 51. Such an antireflection film may be formed by alternately laminating a low refractive film and a high refractive film, and reduces reflectance and increase transmittance of visible light on the surface of the movable substrate 52.

The movable electrode 562 faces the fixed electrode 561 through the predetermined electrode gap and has a circular shape which is the same shape as the fixed electrode 561. The movable electrode 562 and the fixed electrode 561 are included in the electrostatic actuator 56. Furthermore, a movable connection electrode 564 connected to an outer circumferential edge of the movable electrode 562 is disposed on the movable substrate 52. The movable connection electrode 564 is disposed in a region from the movable portion 521 to the electric surface 524 along a position facing the connection electrode groove (not illustrated) disposed on the fixed substrate 51. The movable connection electrode 564 includes the movable electrode pad 564P electrically connected to an internal terminal portion on the electric surface 524.

The fixed connection electrode 565 is disposed on the movable substrate 52 as described above, and the fixed connection electrode 565 is connected to the fixed extraction electrode 563 through the bump portion 565A (refer to FIG. 3).

The movable reflection film 55 is disposed in a center portion of a movable surface 521A of the movable portion 521 so as to face the fixed reflection film 54 through the gap G1. As the movable reflection film 55, a reflection film having a configuration the same as that of the fixed reflection film 54 described above is used.

Although the electrode gap is larger than the reflection film gap G1 in this embodiment as described above, the invention is not limited to this. In a case where an infrared ray or a far-infrared ray is used as measurement target light, for example, the gap G1 may be larger than the electrode gap depending on a wavelength range of the measurement target light.

The holding unit 522 is a diaphragm which surrounds the movable portion 521 and has a thickness smaller than that of the movable portion 521. The holding unit 522 easily bends when compared with the movable portion 521 and may cause the movable portion 521 to be displaced toward the fixed substrate 51 by little electrostatic attractive force. In this case, since the movable portion 521 has a thickness larger than the holding unit 522, and therefore, has large rigidity, even when the holding unit 522 is attracted by the electrostatic attractive force toward the fixed substrate 51, a shape of the movable portion 521 is not changed. Accordingly, the movable reflection film 55 disposed on the movable portion 521 also does not bend, and the fixed reflection film 54 and the movable reflection film 55 may be constantly maintained in parallel to each other.

Although the holding unit 522 having a diaphragm shape is illustrated in this embodiment, the invention is not limited to this, and holding units having a beam shape may be disposed at equal angular intervals while the filter center point O is set as a center, for example.

In the movable substrate 52, a region facing the first coupling portion 513 corresponds to the second coupling portion 523. The second coupling film 532 is formed on the second coupling portion 523, and the fixed substrate 51 and the movable substrate 52 are coupled with each other by coupling the second coupling film 532 with the first coupling film 531 as described above.

Configuration of Filter Driving Circuit

The filter driving circuit 134 applies a driving voltage to the electrostatic actuator 56 of the wavelength variable interference filter 5 in response to an instruction signal supplied from the controller 16. By this, electrostatic attractive force is generated between the fixed electrode 561 and the movable electrode 562 of the electrostatic actuator 56 so that the movable portion 521 is displaced toward the fixed substrate 51. The dimension of the gap G1 of the wavelength variable interference filter 5 is set to a value corresponding to a target wavelength.

Configuration of Display

The display 14 is disposed in a display window of the outer casing 11. Any type of display, such as a liquid crystal panel or an organic EL (electroluminescence) panel, may be employed as the display 14 as long as the display is capable of displaying an image.

Furthermore, the display 14 of this embodiment includes a touch panel, and the touch panel may be included in the operation unit 15.

Configuration of Operation Unit

The operation unit 15 includes a shutter button disposed on the outer casing 11 and the touch panel disposed on the display 14 as described above. When the user performs an input operation, the operation unit 15 outputs an operation signal to the controller 16 in accordance with the input operation. The configuration of the operation unit 15 is not limited to that described above, and the operation unit 15 may include a plurality of operation buttons instead of the touch panel.

Configuration of Controller

Figure 5:
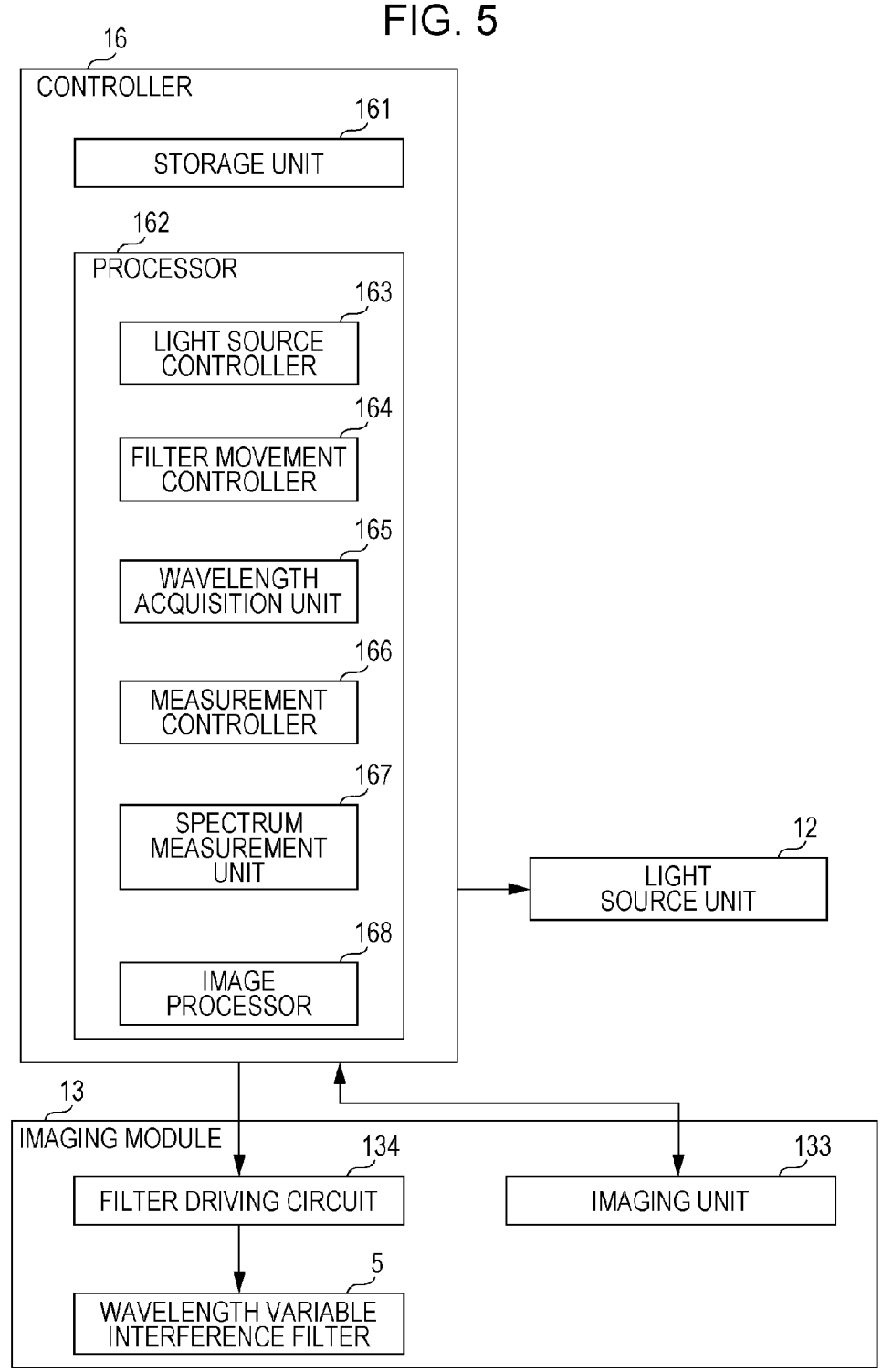
FIG. 5 is a block diagram schematically illustrating a configuration of the spectral camera according to the first embodiment.

FIG. 5 is a block diagram schematically illustrating a configuration of the spectral camera 1 according to this embodiment.

The controller 16 is configured by combining a calculation circuit, such as a CPU, and a storage circuit, such as a memory, with each other and controls the entire operation of the spectral camera 1, for example. The controller 16 includes a storage unit 161 and a processor 162 as illustrated in FIG. 5. The storage unit 161 records various data and various programs for controlling the spectral camera 1.

Examples of the various data stored in the storage unit 161 include V-λ data generated by recording a wavelength of light transmitted through the wavelength variable interference filter 5 relative to a voltage applied to the electrostatic actuator 56 of the wavelength variable interference filter 5 described below.

Furthermore, characteristics of signal values (signal characteristics) output from the light receiving elements 133A when light beams having different wavelength components of the reference light in a spectral wavelength range are individually received by the light receiving elements 133A without using the wavelength variable interference filter 5 are recorded in the storage unit 161. In this embodiment, amounts of light beams having different wavelength components of the reference light in the spectral wavelength range are uniform (that is, an intensity characteristic of the light source unit 12 is stable), and sensitivity characteristics of the light receiving elements 133A in the spectral wavelength range are uniform. Accordingly, the signal characteristics described above are monotonically reduced in the wavelength increasing direction in accordance with a transmittance characteristic of the fixed filter 132.

Furthermore, examples of the various programs include a spectral imaging program and a spectral spectrum measurement program. In a case where a smartphone or a tablet terminal is used as the spectral camera 1 capable of communicating with a server apparatus through a network, the programs may be downloaded from the server apparatus.

The processor 162 reads the various programs stored in the storage unit 161 and executes the various programs so as to function as a light source controller 163, a filter movement controller 164, a wavelength acquisition unit 165, a measurement controller 166, a spectrum measurement unit 167, an image processor 168 (an image generation unit of the invention), and the like as illustrated in FIG. 5.

Note that the case where the processor 162 reads and executes the programs (software) recorded in the storage unit 161 so as to realize the functions described above in combination of the software and the hardware is described as an example in this embodiment. However, the invention is not limited to this. For example, a circuit serving as hardware having the various functions may be provided.

The light source unit 12 emits reference light under control of the light source controller 163.

The sliding mechanism 132A slides the fixed filter 132 on the light path under control of the filter movement controller 164.

The wavelength acquisition unit 165 acquires center wavelengths of light beams received by the light receiving elements 133A of the imaging unit 133.

The measurement controller 166 changes a voltage to be applied to the wavelength variable interference filter 5 and changes the dimension of the gap G1 between the reflection films 54 and 55 in the wavelength variable interference filter 5.

The spectrum measurement unit 167 measures spectral spectra in pixels included in a captured image in accordance with obtained light amounts of the light receiving elements 133A.

The image processor 168 generates a spectral image having a desired target wavelength.

The functional configurations thereof will be described hereinafter in detail.

Spectral Image Capturing Method by Spectral Camera Light Reception Wavelength Acquisition Process The spectral camera 1 of this embodiment obtains a spectral image with high accuracy by performing a process of correcting a spectral image of a measurement target (imaging target) after receiving center wavelengths of light beams received by the light receiving elements 133A corresponding to the pixels of the capturing image. A light reception wavelength acquisition process in the light receiving elements 133A (light reception wavelength acquisition method) will now be described.

Figure 6:
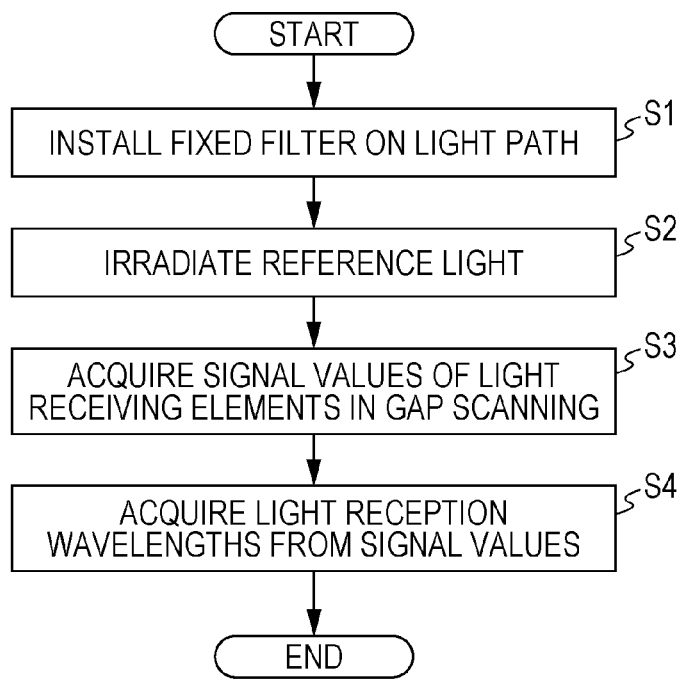
FIG. 6 is a flowchart illustrating a light reception wavelength acquisition process performed by the spectral camera according to the first embodiment.

FIG. 6 is a flowchart illustrating the light reception wavelength acquisition method for acquiring center wavelengths of light beams received by the light receiving elements 133A.

In the light reception wavelength acquisition process, a reference plate X (refer to FIG. 7) having a predetermined reflectance is captured as an imaging target by the spectral camera 1. In this embodiment, a white reference plate having uniform reflectance in wavelength components in the spectral wavelength range is used as a reference object. As an imaging environment, the imaging is preferably performed in a dark room which is not affected by outside light.

The sliding mechanism 132A arranges the fixed filter 132 on a light path of light incident from the incident optical system 131 under control of the filter movement controller 164 (step S1).

Furthermore, the light source controller 163 drives the light source unit 12 so that reference light is irradiated to the reference object (step S2).

The measurement controller 166 successively changes a driving voltage to be applied from the filter driving circuit 134 to the electrostatic actuator 56 and changes the dimension of the gap G1 between the reflection films 54 and at a certain interval, for example, so as to acquire signal values output from the light receiving elements 133A when the driving voltage is successively changed. Specifically, the measurement controller 166 acquires signal values output from the light receiving elements 133A when the gap G1 is scanned (step S3).

Furthermore, the measurement controller 166 stores the acquired signal values of the light receiving elements 133A and the driving voltages at times when the signal values are acquired which are associated with each other in the storage unit 161. Note that the process in step S1 to step S3 corresponds to a process of causing the imaging unit to receive reference light through the spectral filter in the light reception wavelength acquisition method of the invention.

Thereafter, the wavelength acquisition unit 165 specifies (acquires) center wavelengths of the light beams received by the light receiving elements 133A in accordance with the obtained signal values (step S4). The process in step S4 corresponds to a process of acquiring center wavelengths of the light beams individually incident on the plurality of light receiving elements in the light reception wavelength acquisition method of the invention.

Figure 7:
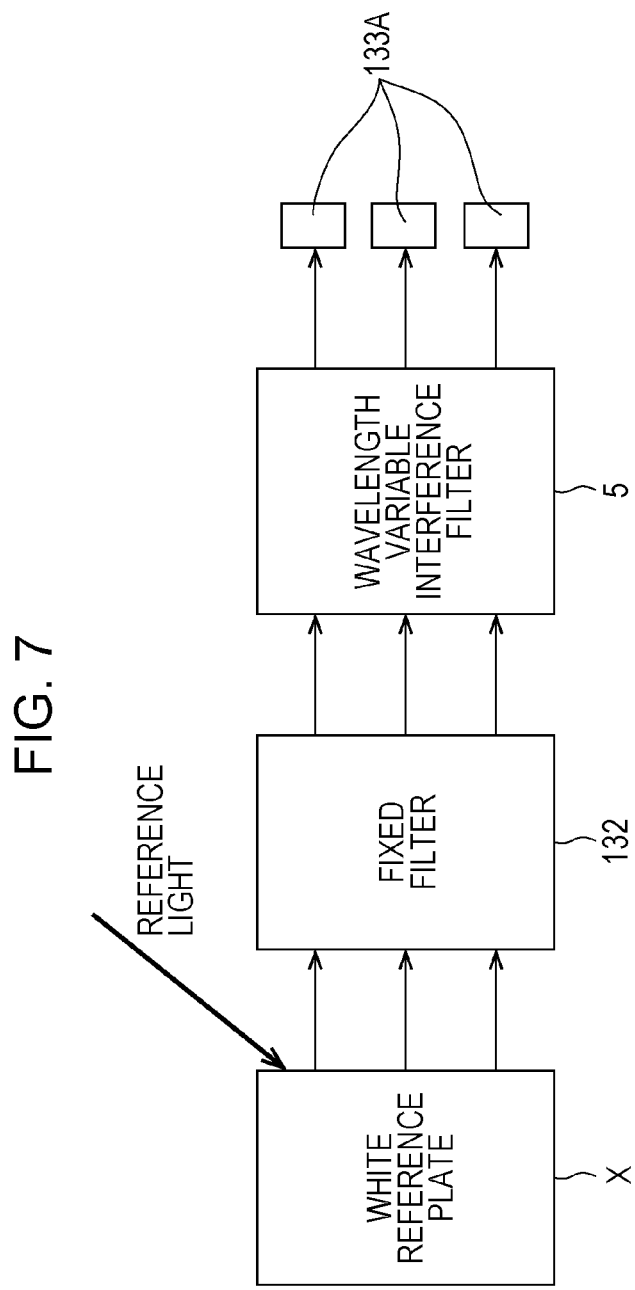
FIG. 7 is a diagram illustrating a path of reference light in the light reception wavelength acquisition process according to the first embodiment.
Figure 8:
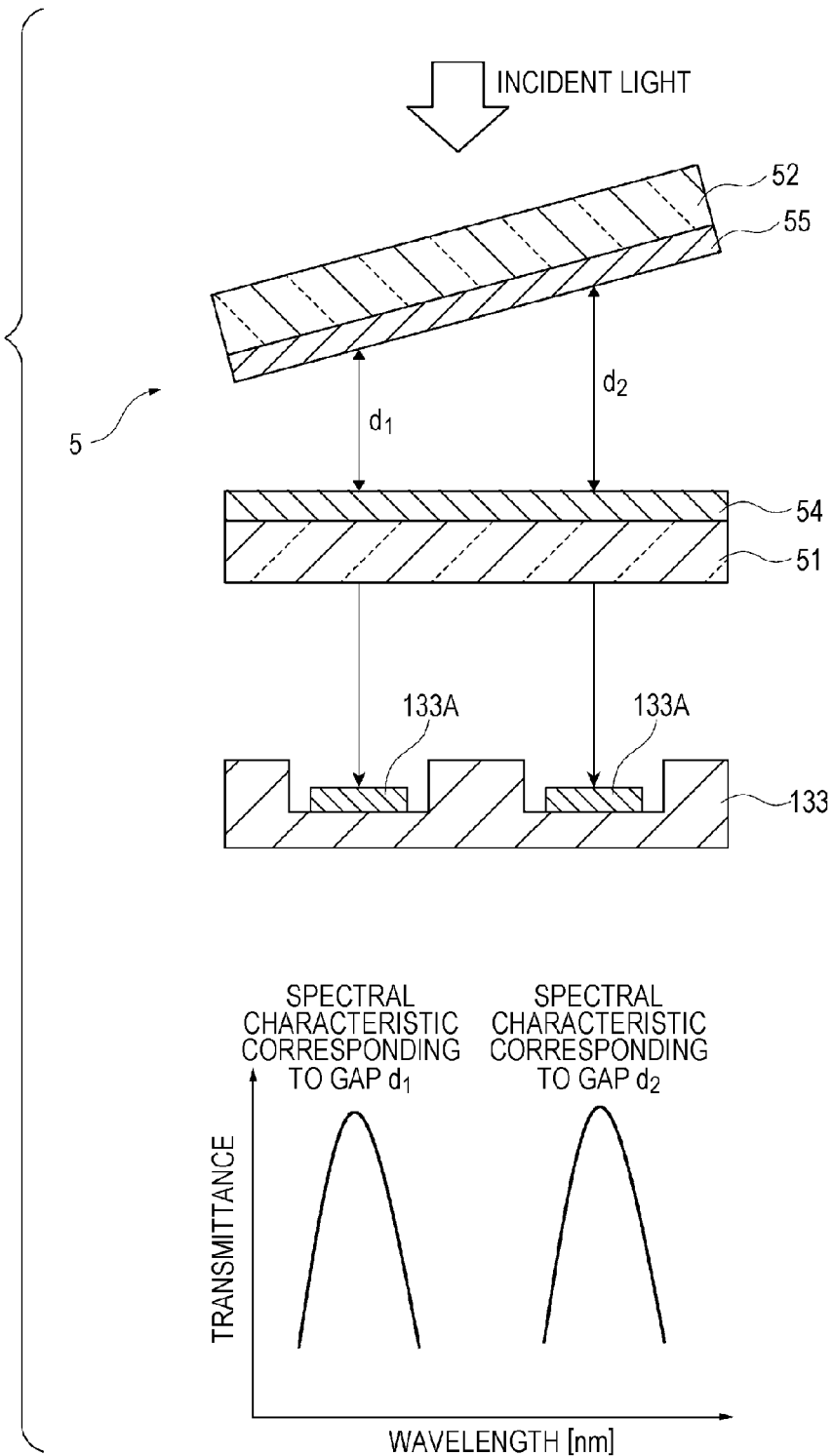
FIG. 8 is a diagram illustrating variation of light reception wavelengths caused by in-plane variation in the wavelength variable interference filter.

FIG. 7 is a diagram illustrating an arrangement of optical members and a path of the reference light in the light reception wavelength acquisition process. FIG. 8 is a diagram illustrating variation of light reception wavelengths caused by in-plane variation of the wavelength variable interference filter 5.

According to step S1 and step S2 described above, the reference light emitted from the light source unit 12 is irradiated onto the reference plate X (white reference plate) as illustrated in FIG. 7. Reflection light reflected by the white reference plate X is incident on the spectral camera 1 from the incident optical system 131 and received by the light receiving elements 133A of the imaging unit 133 through the fixed filter 132 and the wavelength variable interference filter 5. By this, signal values corresponding to amounts of reception light beams are output from the light receiving elements 133A to the controller 16.

Here, as illustrated in FIG. 8, the wavelength variable interference filter 5 of this embodiment simultaneously disperses (plane spectroscopy) the light incident on a region in which the reflection films 54 and 55 overlap with each other and allows light beams of certain wavelengths obtained by the plane spectroscopy to pass. Accordingly, in a case where the dimension of the gap G1 between the reflection films 54 and 55 is uniform in the wavelength variable interference filter 5, the signal values output from the light receiving elements 133A are the same. On the other hand, when the dimension of the gap G1 is not uniform, that is, when in-plane variation is generated, a wavelength of the light transmitted through the wavelength variable interference filter 5 varies depending on a position of the transmission due to the variation of the dimension of the gap G1. For example, a spectral characteristic of a light beam transmitted in a position corresponding to a dimension $d_1$ and a spectral characteristic of a light beam transmitted in a position corresponding to a dimension $d_2$ are different from each other. Accordingly, the in-plane variation occurs also in the signal values output from the light receiving elements 133A.

In step S4, the wavelength acquisition unit 165 specifies center wavelengths of the light beams received by the light receiving elements 133A in accordance with the variation of the signal values.

Specifically, in this embodiment, as the reference light irradiated from the light source unit 12 as described above, light in which light amounts do not vary in a plane and light amounts corresponding to the wavelength components in the spectral wavelength range are uniform is used. Furthermore, sensitivities of the light receiving elements 133A relative to the wavelength components in the spectral wavelength range are uniform. Furthermore, the white reference plate X has uniform reflectance relative to the wavelength components in the spectral wavelength range. With this configuration, amounts of light beams received by the light receiving elements 133A are determined in accordance with a transmittance characteristic of the fixed filter 132.

Figure 9:
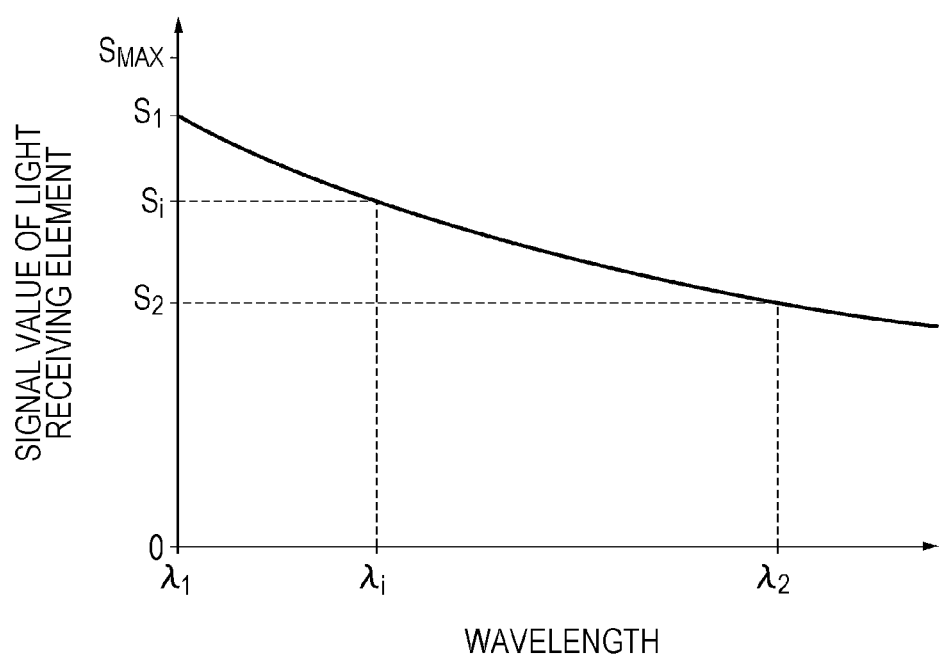
FIG. 9 is a graph illustrating signal characteristics of signal values output from light receiving elements according to the first embodiment.

FIG. 9 is a graph illustrating characteristics of signal values (signal characteristics) output from the light receiving elements 133A according to this embodiment. As illustrated in FIG. 9, in this embodiment, signal values relative to the light beams received by the light receiving elements 133A are determined in accordance with the transmittance characteristic of the fixed filter 132, and the wavelength acquisition unit 165 specifies center wavelengths of the light beams received by the light receiving elements 133A in accordance with the signal values.

For example, as illustrated in FIG. 9, when a signal value $S_i$ is output from a certain one of the light receiving elements 133A, a center wavelength of a light beam received by the light receiving element 133A is determined to $\lambda_i$.

The process in step S4 described above is performed on the signal values of the light receiving elements 133A acquired in step S3. Specifically, information representing wavelengths of the light beams received by the respective light receiving elements 133A while the dimension of the gap G1 is changed at a predetermined interval is acquired. In other words, the wavelength acquisition unit 165 acquires center wavelengths λ of the light beams received by the light receiving elements 133A relative to the driving voltage V. The acquired data is stored in the storage unit 161 as V-λ data of the light receiving elements 133A.

As described above, by acquiring the center wavelengths of the light beams of the light receiving elements 133A, distribution of the in-plane variation between the reflection films 54 and 55 in the wavelength variable interference filter 5 may be recognized.

Spectral Image Capturing Process

Next, a method for acquiring a spectral image by the spectral camera 1 of this embodiment will be described.

In this embodiment, since distribution of the in-plane variation between the reflection films 54 and 55 in the wavelength variable interference filter 5 may be recognized by the light reception wavelength acquisition process described above, a spectral image may be acquired with high accuracy taking the distribution of the in-plane variation into consideration.

Figure 10:
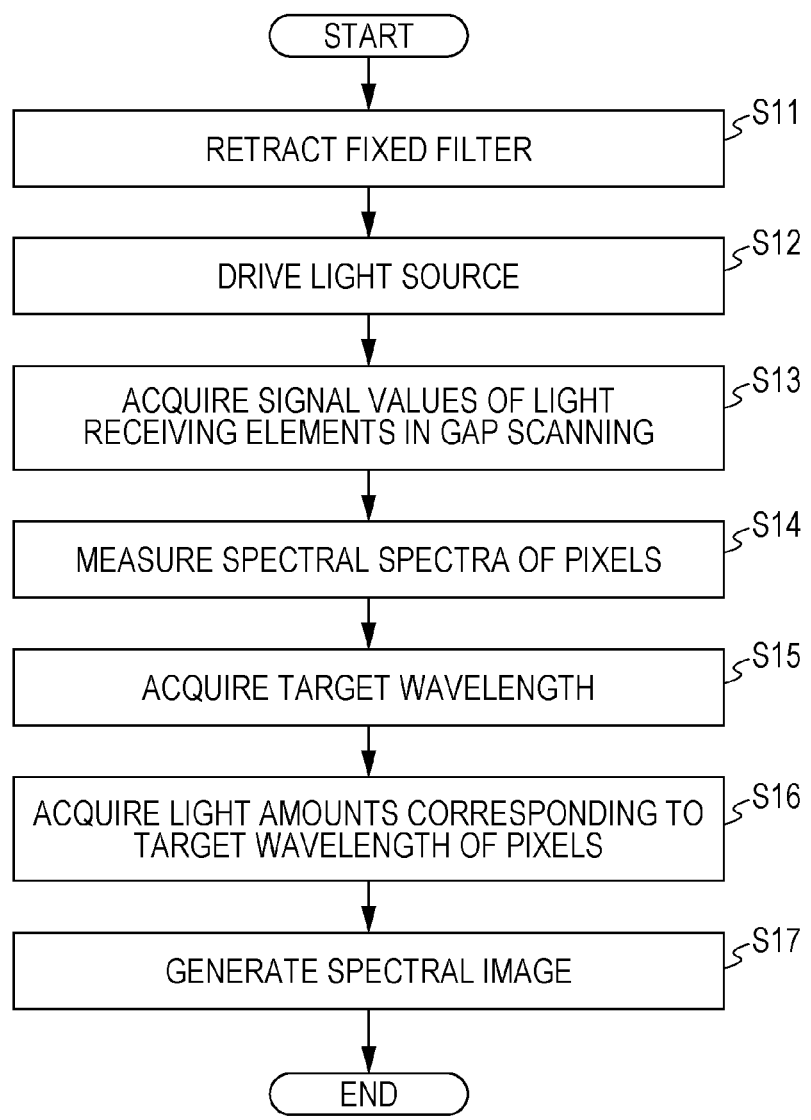
FIG. 10 is a flowchart illustrating a spectral image capturing process according to the first embodiment.
Figure 11:
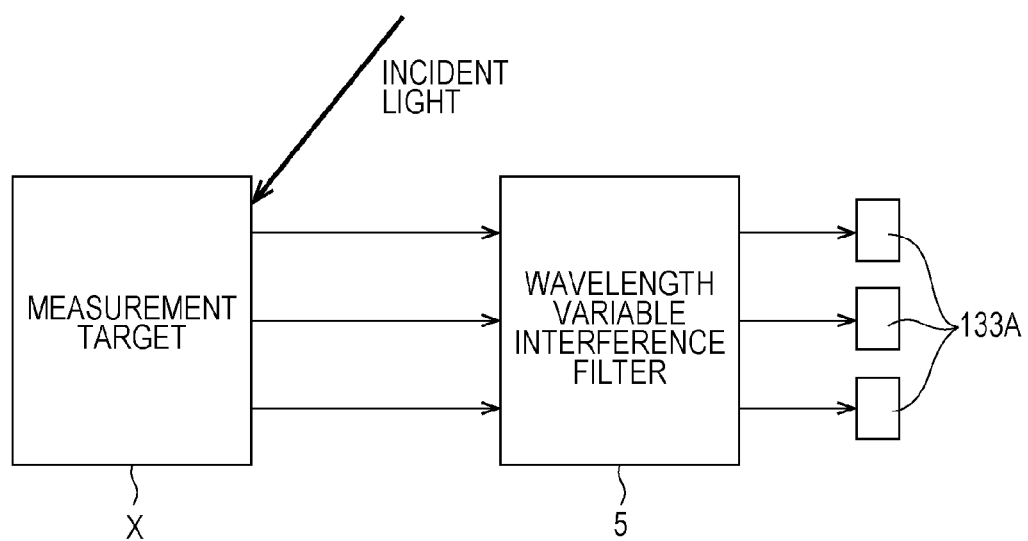
FIG. 11 is a diagram illustrating a path of a measurement light in the spectral image capturing process according to the first embodiment.

FIG. 10 is a flowchart illustrating a spectral image capturing process of this embodiment. FIG. 11 is a diagram illustrating an arrangement of the optical members and a path of measurement light when a spectral image is to be captured.

In the spectral image capturing process, first, the sliding mechanism 132A retracts the fixed filter 132 from the light path of the light incident from the incident optical system 131 under control of the filter movement controller 164 (step S11).

Furthermore, the light source controller 163 drives the light source unit 12 so that light (reference light) is irradiated to an imaging target (step S12). Since the light amounts corresponding to the wavelength components in the spectral wavelength range of the reference light are substantially the same as one another in this embodiment, a case where only an amount of light having a specific wavelength in the imaging target is changed does not occur, and accordingly, a light reception amount of the imaging unit 133 may be improved.

In step S11 and step S12, the light reflected by the imaging target is guided from the incident optical system 131 to the wavelength variable interference filter 5 as illustrated in FIG. 11, and the light transmitted through the wavelength variable interference filter 5 is received by the imaging unit 133.

After an operation for capturing a spectral image is performed by the user, the measurement controller 166 successively changes a driving voltage to be applied from the filter driving circuit 134 to the electrostatic actuator 56 so as to change the dimension of the gap G1 between the reflection films 54 and 55 at a certain interval, for example, and acquires signal values output from the light receiving elements 133A when the driving voltage is successively changed. Specifically, the measurement controller 166 acquires signal values output from the light receiving elements 133A when the gap G1 is scanned (step S13). Note that driving voltages to be set preferably have voltage values the same as those of the driving voltages used in step S3.

Here, center wavelengths of the light beams received by the light receiving elements 133A relative to the driving voltages applied to the electrostatic actuator are acquired by the light reception wavelength acquisition process as described above. That is, the center wavelengths of the light beams received by the light receiving elements 133A relative to the driving voltages applied to the electrostatic actuator 56 are acquired in advance in step S13.

Accordingly, in the spectral image capturing process, the center wavelengths of the light beams received by the light receiving elements 133A and amounts of the light beams may be acquired.

Thereafter, the spectrum measurement unit 167 measures spectral spectra of the pixels in accordance with the amounts of the light beams received by the light receiving elements 133A (light amounts in the pixels) when the dimension of the gap G1 between the reflection films 54 and 55 is successively changed and the center wavelengths of the received light beams (step S14).

Subsequently, the image processor 168 acquires a target wavelength to be used for generation of a spectral image (step S15). The image processor 168 may acquire the target wavelength by an operation of the operation unit 15 performed by the user or may acquire a preset target wavelength, for example. The number of target wavelengths is not particularly limited.

Then the image processor 168 acquires light amounts relative to the set target wavelength in accordance with the spectral spectra of the pixels (step S16) and generates a spectral image having pixel values corresponding to the light amounts (step S17).

In this way, the spectral image having the target wavelength is generated.

Operation of Embodiment

In the light reception wavelength acquisition process performed by the spectral camera 1 of this embodiment, the light source unit 12 emits reference light, the reference plate X reflects the reference light, and the light incident on the imaging unit 133 through the wavelength variable interference filter 5 is detected. In this case, when light beams having different wavelength components of the reference light are individually received by the light receiving elements 133A, different signal values corresponding to the different wavelength components are obtained as illustrated in FIG. 9. Then the wavelength acquisition unit 165 acquires the center wavelengths of the light beams received by the light receiving elements 133A in accordance with the signal values output from the light receiving elements 133A of the imaging unit 133.

With this configuration, in the light reception wavelength acquisition process, the center wavelengths of the light beams received by the light receiving elements 133A may be easily specified with high accuracy in accordance with the signal values obtained when the reference light is received. Accordingly, in the spectral image acquisition process, the relationships between values of pixels in a captured image and wavelengths may be determined with ease when the image is captured, and a spectral image for the target wavelength may be acquired with high accuracy. For example, the dimension of the gap G1 in the wavelength variable interference filter 5 is successively changed such that light beams having the target wavelength are received by the light receiving elements 133A and signal values are obtained, and thereafter, a spectral image including pixels having gradation values corresponding to the light amounts of the target wavelength is generated in accordance with the signal values. In this way, the spectral image may be acquired with high accuracy.

In this embodiment, the fixed filter 132 having different transmittances for different wavelength components in the spectral wavelength range is slidably disposed on the light path of the light incident from the incident optical system 131 to the imaging unit 133.

In a case where the light amounts corresponding to the wavelength components of the reference light are uniform (or substantially uniform) and the sensitivities to the wavelength components of the light receiving elements 133A are uniform (or substantially uniform) in the spectral wavelength range, when the reference light is received by the light receiving elements 133A, it is difficult to determine center wavelengths of the received light beams. On the other hand, since the fixed filter 132 having different transmittance characteristics for different wavelengths is used in this embodiment, the signal values output from the light receiving elements 133A vary depending on wavelength components, and the center wavelengths of the received light beams may be easily specified.

In this embodiment, signal characteristics obtained when the reference light is received by the light receiving elements 133A are monotonically reduced in the wavelength increasing direction as illustrated in FIG. 9. In this way, when a signal value is monotonically changes relative to wavelengths, one wavelength corresponding to the signal value is determined, and accordingly, the center wavelengths of the light beams received by the light receiving elements 133A may be specified with higher accuracy.

To acquire such signal characteristics, a filter constituted by laminating Ag and $Al_2O_3$ on a glass substrate is used as the fixed filter 132 in this embodiment. The fixed filter 132 which attains such signal characteristics may be fabricated with a simple configuration.

In this embodiment, the light reception amounts of the light receiving elements 133A are detected while the driving voltage to be applied to the electrostatic actuator of the wavelength variable interference filter 5 is successively changed, and the spectrum measurement unit 167 measures spectral spectra in the pixels of the captured image in accordance with the light reception amounts.

In this embodiment, wavelengths of the light beams received by the light receiving elements 133A at a time when a certain driving voltage is applied are acquired in the light reception wavelength acquisition process. Therefore, in the spectral image acquisition process, wavelengths and light amounts of the light beams received by the light receiving elements 133A at a time when the dimension of the gap G1 is scanned may be acquired with accuracy. Accordingly, the spectrum measurement unit 167 may reliably measure the spectral spectra in the pixels.

In this embodiment, the image processor 168 acquires light amounts corresponding to the target wavelength from the spectral spectra of the pixels measured by the spectrum measurement unit 167 and generates a spectral image including the pixels having light amounts corresponding to the acquired light amounts.

In this case, when a plurality of spectral images are acquired (that is, when a plurality of target wavelengths are set) or when a target wavelength is set after an imaging operation is performed, a spectral image having a desired target wavelength or spectral images having desired target wavelengths may be acquired with ease without repetitively performing the imaging operation.

In this embodiment, the light source unit 12 emits the reference light having uniform light amounts in the plane and having the same light amounts corresponding to different wavelengths in the spectral wavelength range. With this configuration, the reference light may be used when a spectral image of an imaging target is to be captured. In a case where outside light, such as natural light, is used as irradiation light for irradiating an imaging target, for example, different light amounts may be acquired depending on a wavelength, and in this case, a spectral image of the imaging target may not be acquired with high accuracy due to influence of the outside light. For example, when component analysis is performed on the basis of a spectral image, the influence of the outside light is particularly large. On the other hand, since the reference light described above is used in this embodiment, variation of irradiation light depending on a wavelength is not generated, and accordingly, a spectral image may be acquired with accuracy.

In this embodiment, the driving voltage to be applied to the electrostatic actuator 56 of the wavelength variable interference filter 5 is successively changed and signal values output from the light receiving elements 133A are acquired every time the driving voltage is changed in step S3. Then the wavelength acquisition unit 165 acquires center wavelengths of light beams received by the light receiving elements 133A relative to the driving voltage applied to the electrostatic actuator 56 in accordance with the signal values.

With this configuration, even in a case where a flexure state of the movable substrate 52 is changed in accordance with change of the dimension of the gap G1, and therefore, variation of the gap G1 between the reflection films 54 and 55 occurs, the center wavelengths of the light beams received by the light receiving elements 133A relative to the gap dimension may be acquired. By this, distribution of the in-plane variation caused by the flexure of the substrate may be recognized, and accordingly, a spectral image may be acquired with higher accuracy by the spectral image acquisition process.

Furthermore, in this embodiment, the wavelengths of the light beams received by the light receiving elements 133A are acquired by the wavelength acquisition unit 165 taking not only the in-plane variation of the gap G1 in the wavelength variable interference filter 5 described above but also an incident angle of the light guided by the incident optical system 131 to the wavelength variable interference filter 5 into consideration. Specifically, in the wavelength variable interference filter 5, when the incident angle of the light incident on the reflection films 54 and 55 is changed, an optical distance between the reflection films 54 and 55 is changed, and accordingly, a wavelength of the transmission light is also changed. In this embodiment, even in a case where the wavelength of the light transmitted through the wavelength variable interference filter 5 is shifted due to variation of an incident angle caused by different incident positions of the incident light described above, in addition to the in-plane variation of the gap G1, the center wavelengths of the light beams received by the light receiving elements 133A may be acquired with high accuracy. Specifically, in this embodiment, even in a case where in-plane variation occurs in fabrication of the wavelength variable interference filter 5 or even in a case where variation in fabrication of the incident optical system 131 occurs, a spectral image may be acquired with high accuracy.

Second Embodiment

A second embodiment of the invention will now be described.

In the first embodiment, the wavelength characteristic of the reference light is substantially uniform, the sensitivity characteristics of the light receiving elements 133A are substantially uniform, and the reflectance characteristic of the white reference plate X is substantially uniform for different wavelength components in the spectral wavelength range.

The second embodiment is different from the first embodiment in that a wavelength characteristic of reference light varies depending on wavelength components in a spectral wavelength range. Note that the reference numerals the same as those of the first embodiment are assigned to the same components and the same processing steps, and descriptions thereof are omitted or simplified.

Figure 12:
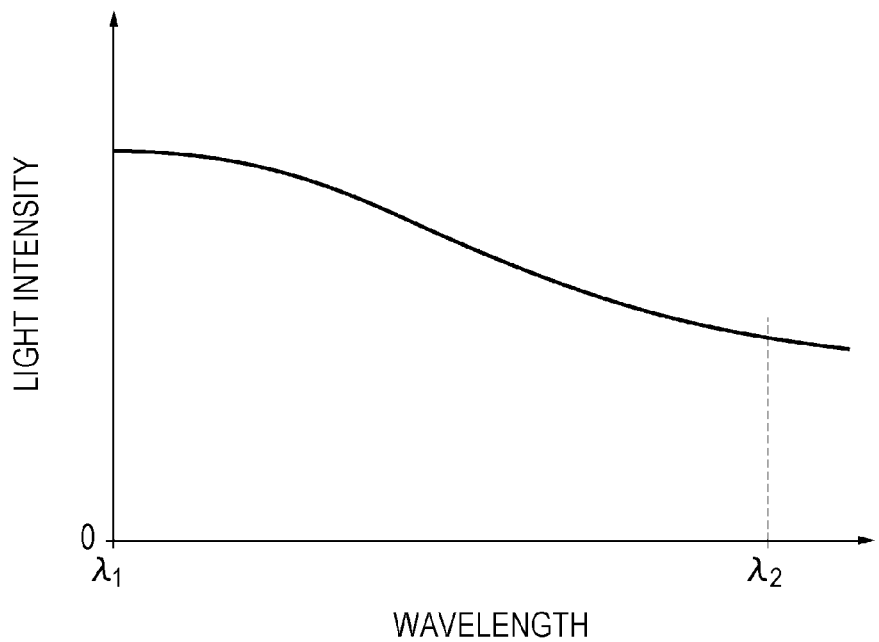
FIG. 12 is a graph illustrating a wavelength characteristic of reference light output from a light source unit according to a second embodiment.
Figure 13:
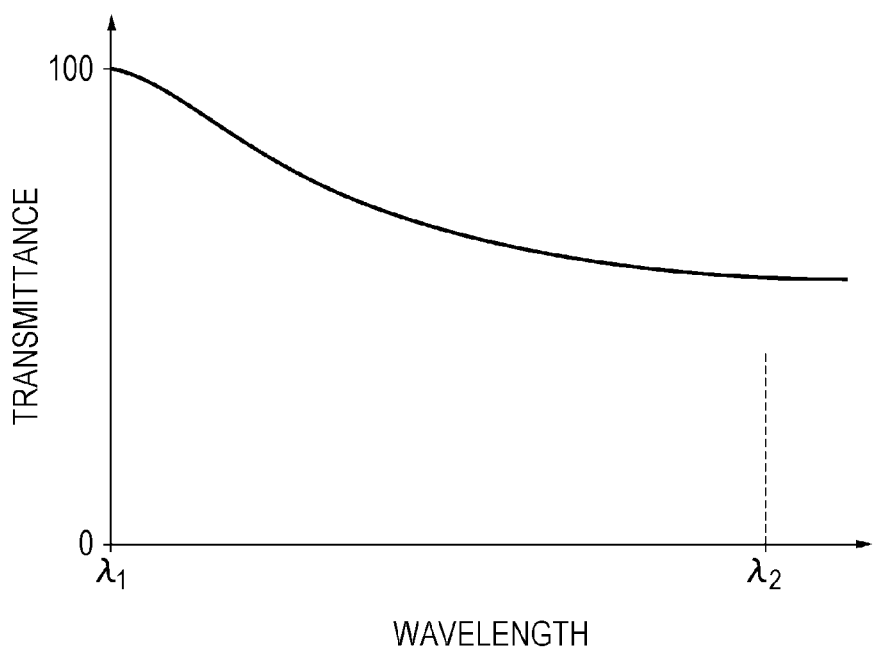
FIG. 13 is a graph illustrating a transmittance characteristic of a fixed filter according to the second embodiment.

FIG. 12 is a graph illustrating a wavelength characteristic of reference light output from a light source unit according to the second embodiment. FIG. 13 is a graph illustrating a transmittance characteristic of a fixed filter 132 according to the second embodiment.

As illustrated in FIG. 12, the reference light output from a light source unit 12 has different values depending on wavelength components in a spectral wavelength range in this embodiment. In this case, a filter having the transmittance characteristic illustrated in FIG. 13 is used as the fixed filter 132, for example.

By this, when the reference light is received by light receiving elements 133A, a signal characteristic in which a signal value is monotonically reduced in a wavelength increasing direction may be obtained as illustrated in FIG. 9.

Also with this configuration, center wavelengths of light beams received by the light receiving elements 133A may be acquired by a process the same as that performed in the first embodiment.

Third Embodiment

A third embodiment of the invention will now be described.

In the first embodiment, the wavelength characteristic of the reference light is substantially uniform, the sensitivity characteristics of the light receiving elements 133A are substantially uniform, and the reflectance characteristic of the white reference plate X is substantially uniform for different wavelength components in the spectral wavelength range.

The third embodiment is different from the first embodiment in that sensitivity characteristics of light receiving elements 133A vary depending on wavelength components in a spectral wavelength range.

Figure 14:
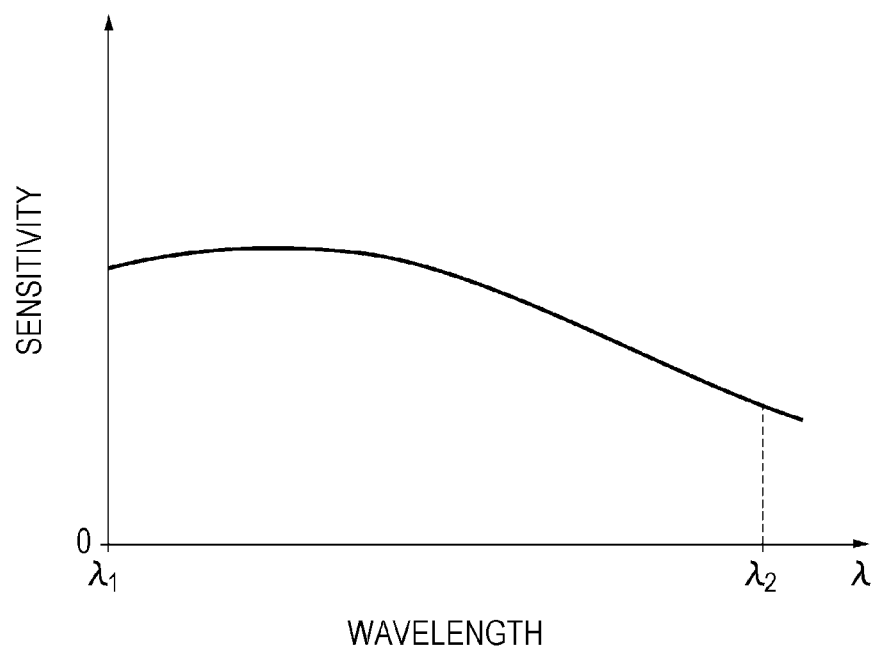
FIG. 14 is a graph illustrating sensitivity characteristics of light receiving elements according to a third embodiment.
Figure 15:
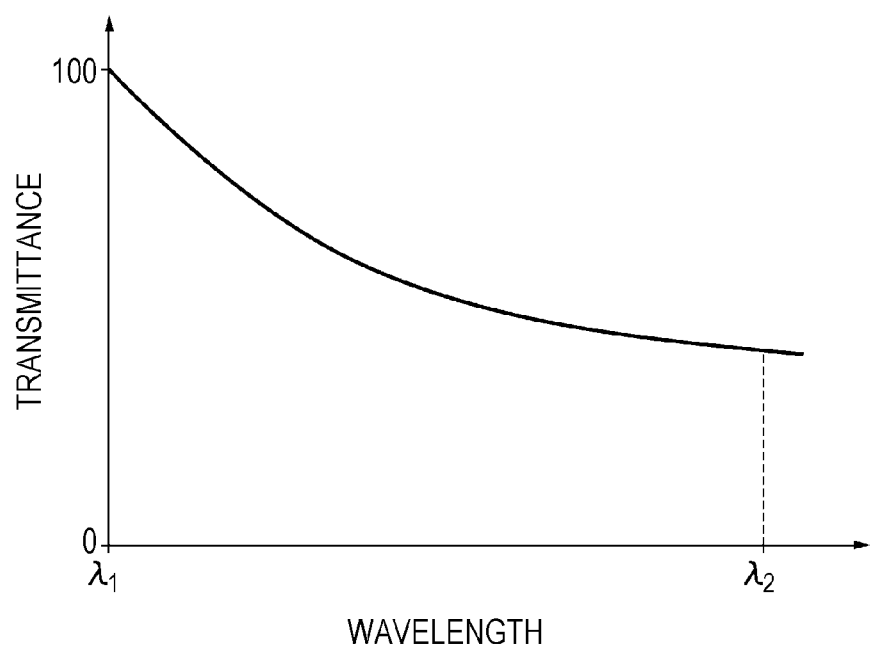
FIG. 15 is a graph illustrating a transmittance characteristic of a fixed filter according to the third embodiment.

FIG. 14 is a graph illustrating the sensitivity characteristics of the light receiving element 133A according to the third embodiment. FIG. 15 is a graph illustrating a transmittance characteristic of a fixed filter 132 according to the third embodiment.

As illustrated in FIG. 14, the sensitivity characteristics of the light receiving elements 133A have different values depending on the wavelength components in the spectral wavelength range in this embodiment. In this case, a filter having the transmittance characteristic illustrated in FIG. 15 is used as the fixed filter 132, for example.

By this, when reference light is received by light receiving elements 133A, a signal characteristic in which a signal value is monotonically reduced in a wavelength increasing direction may be obtained as illustrated in FIG. 9.

Also with this configuration, center wavelengths of light beams received by the light receiving elements 133A may be acquired by a process the same as that performed in the first embodiment.

Fourth Embodiment

A fourth embodiment of the invention will now be described with reference to the accompanying drawings.

In the first embodiment, the center wavelengths of the light beams received by the light receiving elements 133A of the spectral camera 1 serving as the spectral image capturing apparatus are acquired and a spectral image is acquired in accordance with the reception light wavelengths with high accuracy. When the configuration of the invention is employed, an incident angle of light incident on the light receiving elements 133A may also be acquired. Incident angles of the light beams incident on the light receiving elements 133A correspond to incident angles to the wavelength variable interference filter 5, and when variation of the incident angles is examined, distortion and the like of lenses included in an incident optical system 131 may be examined.

In the fourth embodiment, a configuration for acquiring incident angles of light beams incident on the light receiving elements 133A as described above and an incident angle acquisition method will be described.

Note that, a purpose of this embodiment is to examine distortion and the like of the lenses included in the incident optical system 131, and a filter in which in-plane unevenness does not occur is preferably used as the wavelength variable interference filter 5. Examples of such a filter include a wavelength variable interference filter which does not include the holding unit 522 (diaphragm). In this case, in-plane unevenness in a gap G1 between reflection films caused by flexure of the holding unit 522 is suppressed. Furthermore, instead of the wavelength variable interference filter 5, an interference filter having a fixed gap G1 may be employed, for example. In this case, an interference filter which includes an optical film between reflection films and which does not include an air gap may be used, for example.

Figure 16:
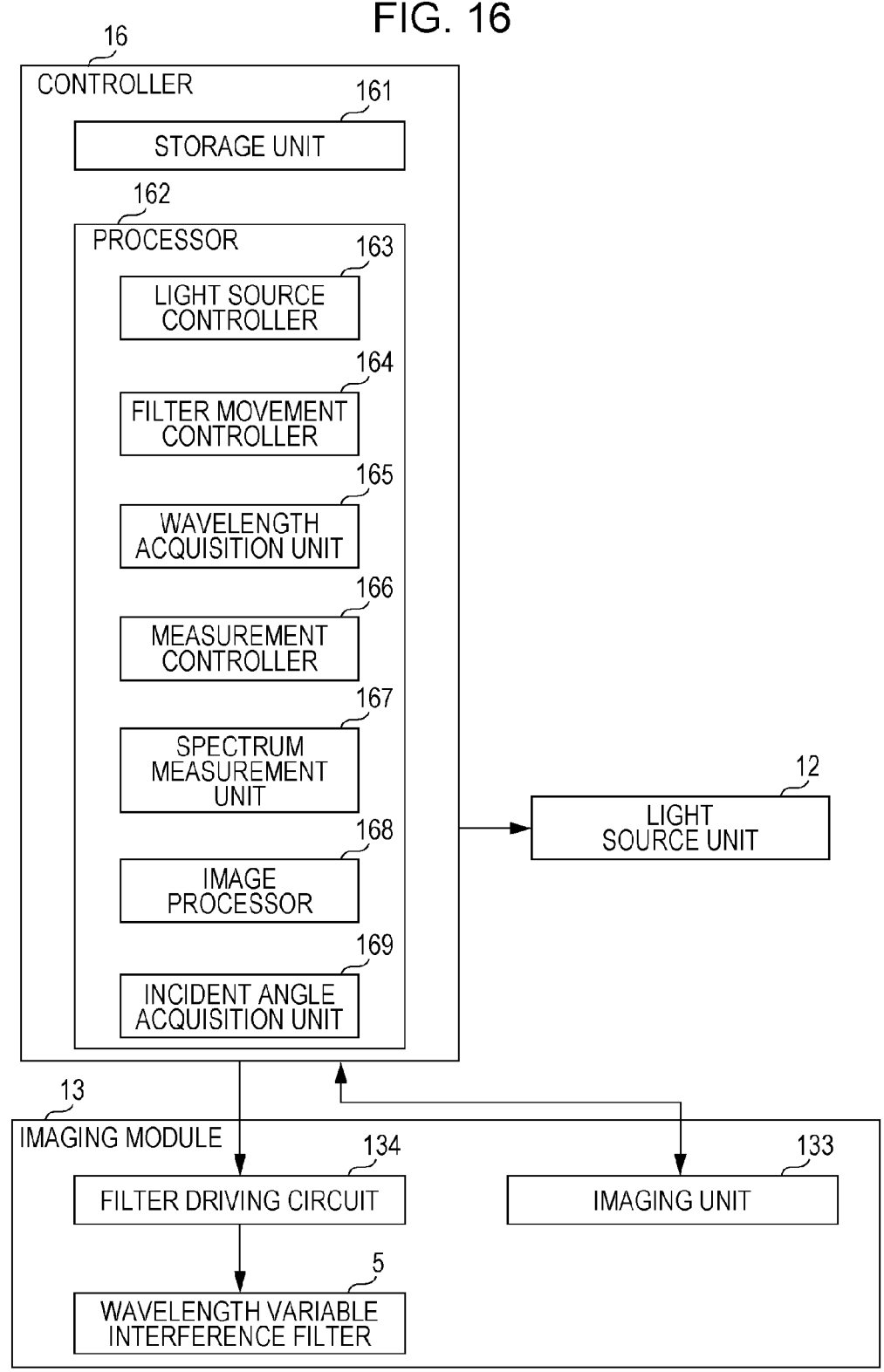
FIG. 16 is a block diagram schematically illustrating a configuration of a spectral camera according to a fourth embodiment.

FIG. 16 is a diagram schematically illustrating a configuration of the spectral camera 1 of this embodiment. A processor 162 of a controller 16 also functions as an incident angle acquisition unit 169 in addition to the functional configurations of the first embodiment.

Figure 17:
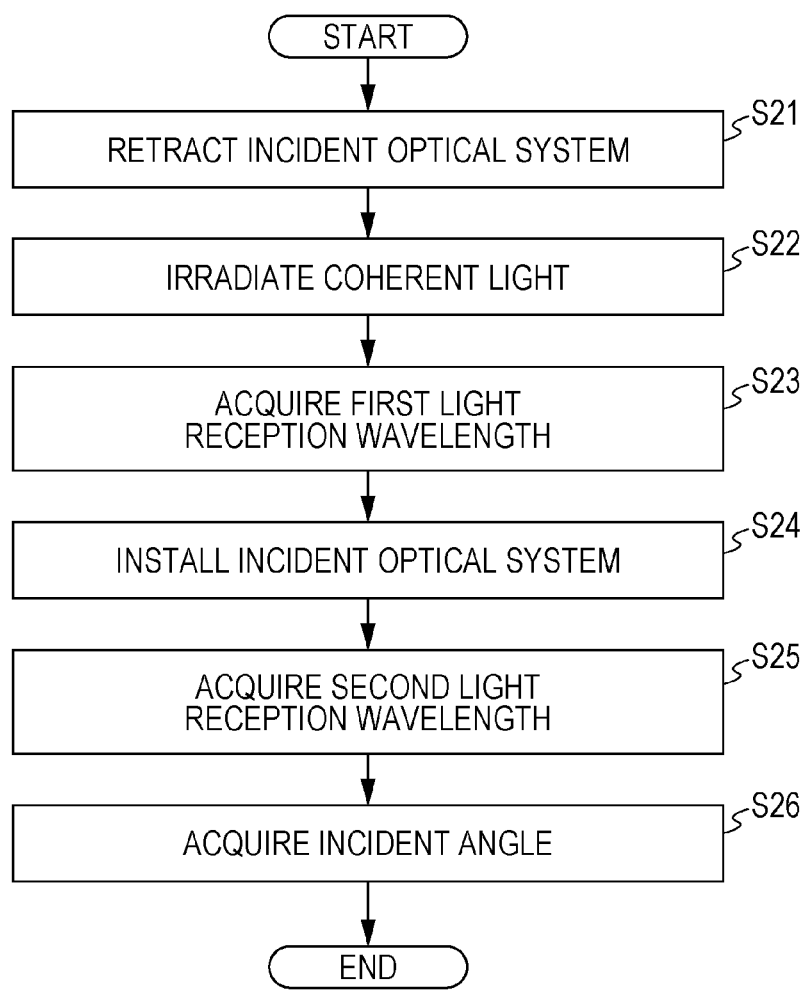
FIG. 17 is a flowchart illustrating an incident angle acquisition process according to the fourth embodiment.

FIG. 17 is a flowchart illustrating an incident angle acquisition process.

Figure 18:
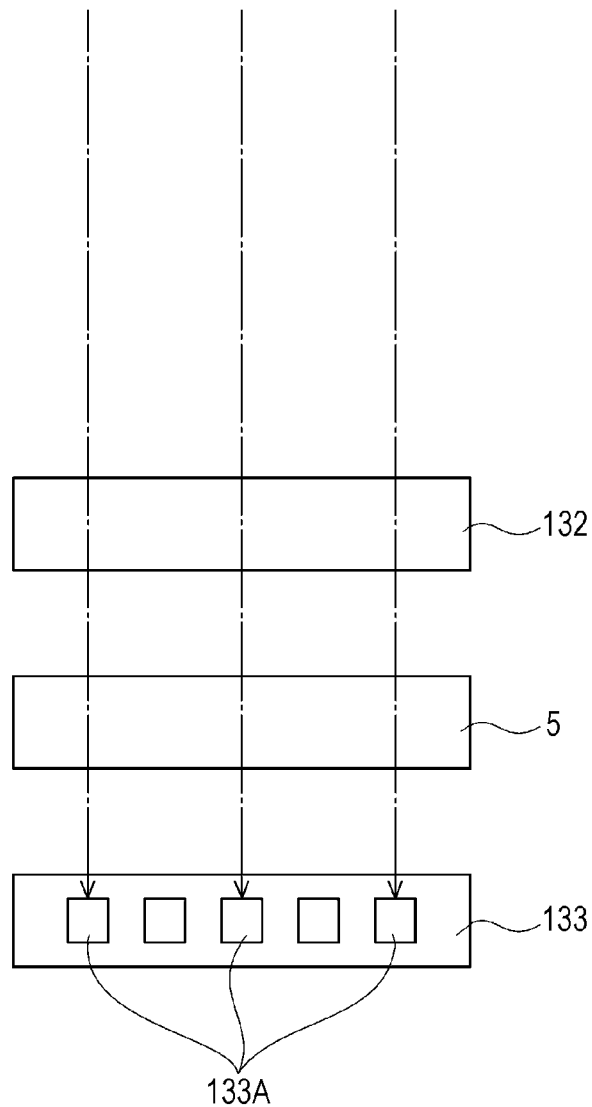
FIG. 18 is a diagram illustrating the incident angle acquisition process according to the fourth embodiment.
Figure 19:
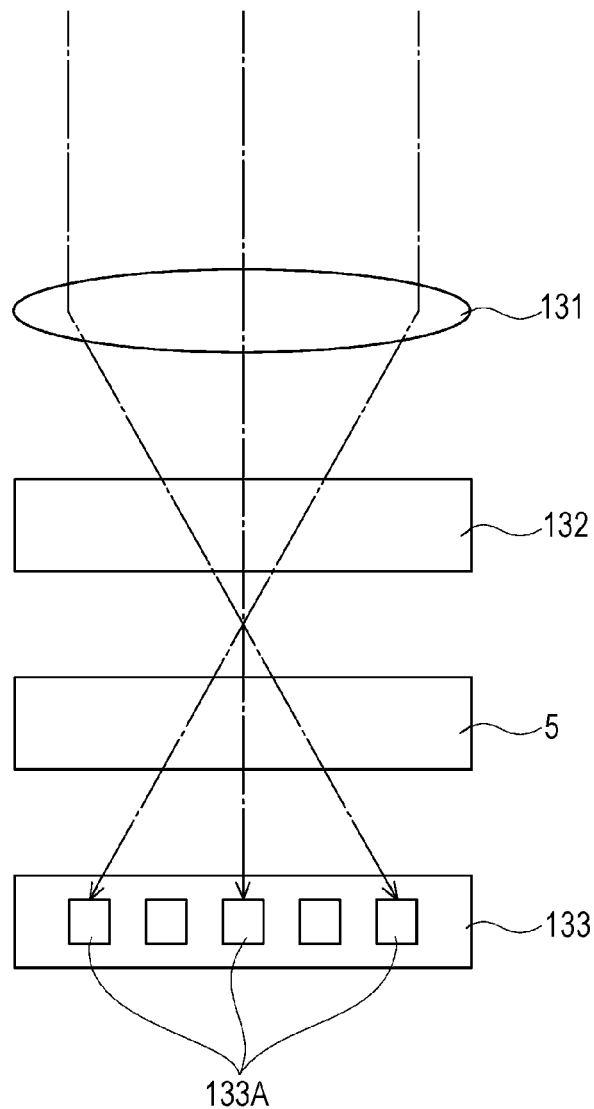
FIG. 19 is a diagram illustrating the incident angle acquisition process according to the fourth embodiment.

FIGS. 18 and 19 are diagrams illustrating a method for acquiring incident angles of light beams incident on the light receiving elements 133A of this embodiment.

In the incident angle acquisition process of the fourth embodiment, first, the incident optical system 131 is retracted from a light path of reference light (step S21). The incident optical system 131 may be detachable from the spectral camera 1, and the incident optical system 131 may be temporarily detached when incident angles are examined in fabrication.

Thereafter, as illustrated in FIG. 18, coherent light is incident on the spectral camera 1 (step S22). By irradiating the coherent light, light beams are incident on the light receiving elements 133A in an angle of 90 degrees.

Subsequently, as with the first embodiment, a wavelength acquisition unit 165 acquires center wavelengths of the light beams (first light reception wavelengths) received by the light receiving elements 133A in accordance with signal values output from the light receiving elements 133A (step S23).

Thereafter, the incident optical system 131 is disposed on the light path of the reference light by setting the incident optical system 131 in the spectral camera 1 or the like (step S24). In this embodiment, the light beams are incident on the light receiving elements 133A by different incident angles due to presence of the incident optical system 131 as illustrated in FIG. 19.

Then, as with the first embodiment, a wavelength acquisition unit 165 acquires center wavelengths of the light beams (second light reception wavelengths) received by the light receiving elements 133A on the basis of signal values output from the light receiving elements 133A (step S25).

Thereafter, the incident angle acquisition unit 169 acquires (calculates) incident angles to the light receiving elements 133A on the basis of the first light reception wavelengths $\lambda_1$, the second light reception wavelengths $\lambda_2$, and an initial gap dimension of the gap G1 of the wavelength variable interference filter 5 (step S26).

Figure 20:
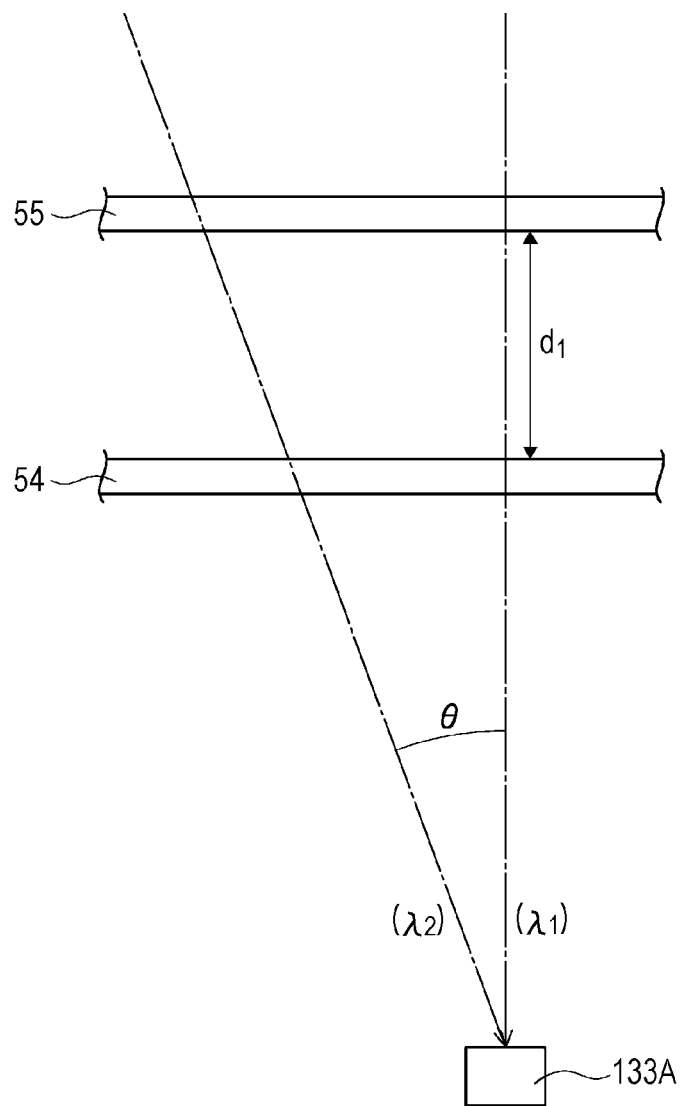
FIG. 20 is a diagram illustrating a model in a case where a light reception wavelength of one of light receiving elements is changed according to the fourth embodiment.

FIG. 20 is a diagram illustrating a model in a case where a light reception wavelength of one of the light receiving elements 133A is changed.

As illustrated in FIG. 20, since light is irradiated from a normal direction of reflection films 54 and 55 of the wavelength variable interference filter 5, a first light reception wavelength $\lambda_1$ of one of the light receiving elements 133A acquired in step S23 may be represented by Expression (1) using m denoting a degree and n denoting a refraction index of a medium between the reflection films 54 and 55.

$$\lambda_1 = \frac{2nd_1}{m} \quad (1)$$

In Expression (1), "$d_1$" denotes the initial gap dimension of the gap G1 between the reflection films 54 and 55. The initial gap dimension d1 may be calculated in accordance with the first light reception wavelength $\lambda_1$.

On the other hand, in a case where light is incident on the reflection films 54 and 55 of the wavelength variable interference filter 5 by an incident angle θ in step S25, the second light reception wavelength $\lambda_2$ in a corresponding one of the light receiving elements 133A is represented by Expression (2) below.

$$\lambda_2 = \frac{2nd_1}{m} \cos\theta \quad (2)$$

Accordingly, the incident angle acquisition unit 169 assigns the first light reception wavelength $\lambda_1$ acquired in step S23 to Expression (1) so as to calculate the initial gap dimension $d_1$, and assigns the calculated initial gap dimension $d_1$ and the second light reception wavelength $\lambda_2$ acquired in step S25 to Expression (2) so as to calculate the incident angle θ.

According to the fourth embodiment described above, incident angles θ of the light beams incident on the light receiving elements 133A of the imaging unit 133 may be acquired. With this configuration, an examination as to whether the incident angles θ of the light beams incident on the light receiving elements 133A are appropriate angles may be performed with high accuracy. By this, distortion, aberration, and the like of the lenses of the incident optical system 131 which determines the incident angles θ may be examined, and the spectral camera 1 capable of imaging a spectral image with higher accuracy may be provided.

In this embodiment, a reference filter which does not generate in-plane unevenness (for example, a filter which does not include the holding unit 522 or an interference filter which does not include an air gap) is used as the wavelength variable interference filter 5 so as to examine distortion of the lenses of the incident optical system 131 as described above. In this case, after it is determined that the lenses do not have distortion by the process described above, the wavelength variable interference filter 5 may be incorporated in the spectral camera 1 and wavelengths of light beams received by the light receiving elements 133A may be specified using one of the methods described in the first to third embodiments.

Furthermore, although a case where the wavelength variable interference filter 5 which does not have in-plane unevenness or the interference filter on a wavelength fixed side is used is described as an example in the fourth embodiment, the invention is not limited to this. Specifically, a geometric shape (in-plane unevenness of the dimension of the gap G1) of the wavelength variable interference filter 5 may be calculated from signal values output from the light receiving elements 133A by irradiating the coherent light in step S22 and acquiring the first light reception wavelengths in step S23. Accordingly, a gap d obtained when light is incident by the incident angle θ may be approximated by a function d(θ) using the incident angle θ. When such a method is employed, the distortion of the lenses in the incident optical system 131 may be examined without additionally using a reference filter.

Other Embodiments

The invention is not limited to the foregoing embodiments, and modifications and alterations thereof are included in the invention as long as the purposes of the invention are attained.

In the first embodiment, the driving voltage to be applied to the electrostatic actuator 56 of the wavelength variable interference filter 5 is successively changed and signal values output from the light receiving elements 133A are acquired for individual driving voltages in step S3. On the other hand, the wavelength variable interference filter 5 may not be driven in step S3. In this case, in-plane variation of the gap G1 may be measured in a state in which the gap G1 between the reflection films 54 and 55 is set as an initial gap dimension.

Such a process may be applied to the examination of the initial gap dimension and the like in fabrication of the wavelength variable interference filter 5, for example.

Furthermore, in a case where a thickness of the movable portion 521 is large, and accordingly, the movable portion 521 and the movable reflection film 55 do not bend even when the gap G1 is changed, only variation of the initial gap dimension may be detected as described above. In this case, in the spectral image capturing process, pixel values of an acquired spectral image are corrected in accordance with the variation of the initial gap dimension.

Although the fixed filter 132 is retracted from the light path in the spectral image capturing process in the first embodiment, the fixed filter 132 may be disposed on the light path. In this case, since the transmittance characteristic of the fixed filter 132 is obtained in advance, the pixel values of the captured image are corrected in accordance with the transmittance characteristic of the fixed filter 132.

Furthermore, although the light source is driven to irradiate the reference light in the spectral image capturing process in the first embodiment, the invention is not limited to this. Specifically, the spectral image capturing process may be performed using natural light.

Moreover, the amounts of the light beams corresponding to the wavelength components in the spectral wavelength range are uniform in the reference light in the first embodiment. However, in a case where the light amounts corresponding to the wavelength components of the reference light may be different from one another and a wavelength characteristic of the reference light is obtained in advance, the pixel values of the captured image may be corrected in accordance with the wavelength characteristic.

The signal characteristics which monotonically change as illustrated in FIG. 9 are obtained when the wavelength characteristics of the light beams of the reference light are multiplied by the transmittance characteristic of the fixed filter in the second embodiment and are obtained when the sensitivity characteristics of the light receiving elements are multiplied by the transmittance characteristic of the fixed filter in the third embodiment.

On the other hand, in a case where the wavelength characteristic of the reference light monotonically changes (monotone increasing or monotone decreasing) in the wavelength increasing direction, the fixed filter 132 may not be used. Similarly, in a case where the sensitivity characteristics of the light receiving elements 133A monotonically change (monotone increasing or monotone decreasing) in the wavelength increasing direction, the fixed filter 132 may not be used. Furthermore, even in a case where the wavelength characteristic of the reference light and the sensitivity characteristics of the light receiving elements 133A are substantially uniform for the wavelength components in the spectral wavelength range, when the reflectance characteristic of the reference plate X monotonically changes in the wavelength increasing direction, the fixed filter 132 may not be used.

Specifically, according to the invention, any combination of optical members may be used as long as the signal characteristics illustrated in FIG. 9 are obtained when the reference light is received by the light receiving elements 133A. Accordingly, materials of the various members are set such that even when the wavelength characteristics of the light beams of the reference light, the sensitivity characteristics of the light receiving elements 133A, and the reflectance characteristics of portions of the reference plate X are different from one another, for example, signal values having signal characteristics illustrated in FIG. 9 are output when the reference light is received by the light receiving elements 133A by multiplying the wavelength characteristics, the sensitivity characteristics, or the reflectance characteristics by one another. When the materials of the various members may not be changed, the fixed filter 132 is designed such that the signal characteristics illustrated in FIG. 9 are obtained.

Although the light source unit 12 is integrally disposed on the spectral camera 1 in the first embodiment, the invention is not limited to this and a light source which emits reference light may be provided separately from the spectral camera 1. In this case, the reference light emitted from the light source unit 12 may be directly irradiated onto the incident optical system 131 without using the reference plate X.

Although the spectrum measurement unit 167 measures the spectral spectra of the pixels of the captured image and the image processor 168 generates a spectral image by obtaining light amounts of a target wavelength in accordance with the spectral spectra in the first embodiment, the invention is not limited to this.

For example, in a case where a target wavelength obtained for a spectral image is set in advance, the measurement controller 166 successively changes a driving voltage and acquires signal values supplied from the light receiving elements 133A so that the gap G1 which allows the light receiving elements 133A to acquire the target wavelength is obtained. Then the image processor 168 generates a spectral image in accordance with the signal values obtained when the light reception wavelengths of the light receiving elements 133A become the target wavelength.

Specifically, the measurement controller 166 successively changes a driving voltage to be applied to the electrostatic actuator 56 from a driving voltage Va to a driving voltage Vb in a case where a light reception wavelength of a light receiving element A in the driving voltage Va corresponds to a target wavelength $\lambda s$ and a light reception wavelength of a light receiving element B in the driving voltage Vb corresponds to a target wavelength $\lambda s$. Thereafter, the image processor 168 generates a spectral image using a signal value output from the light receiving element A relative to the driving voltage Va as a pixel value of a pixel corresponding to the light receiving element A and using a signal value output from the light receiving element B relative to the driving voltage Vb as a pixel value of a pixel corresponding to the light receiving element B.

In such a spectral image acquisition process, a process of measuring a spectral spectrum is not required, and accordingly, high-speed processing may be realized.

Although the wavelength variable interference filter 5 is incorporated in the spectral camera 1 in the first embodiment, the invention is not limited to this. For example, a filter mechanism 20 including the wavelength variable interference filter 5 may be attached to a device having a camera, such as a smartphone, as illustrated in FIG. 21.

Figure 21:
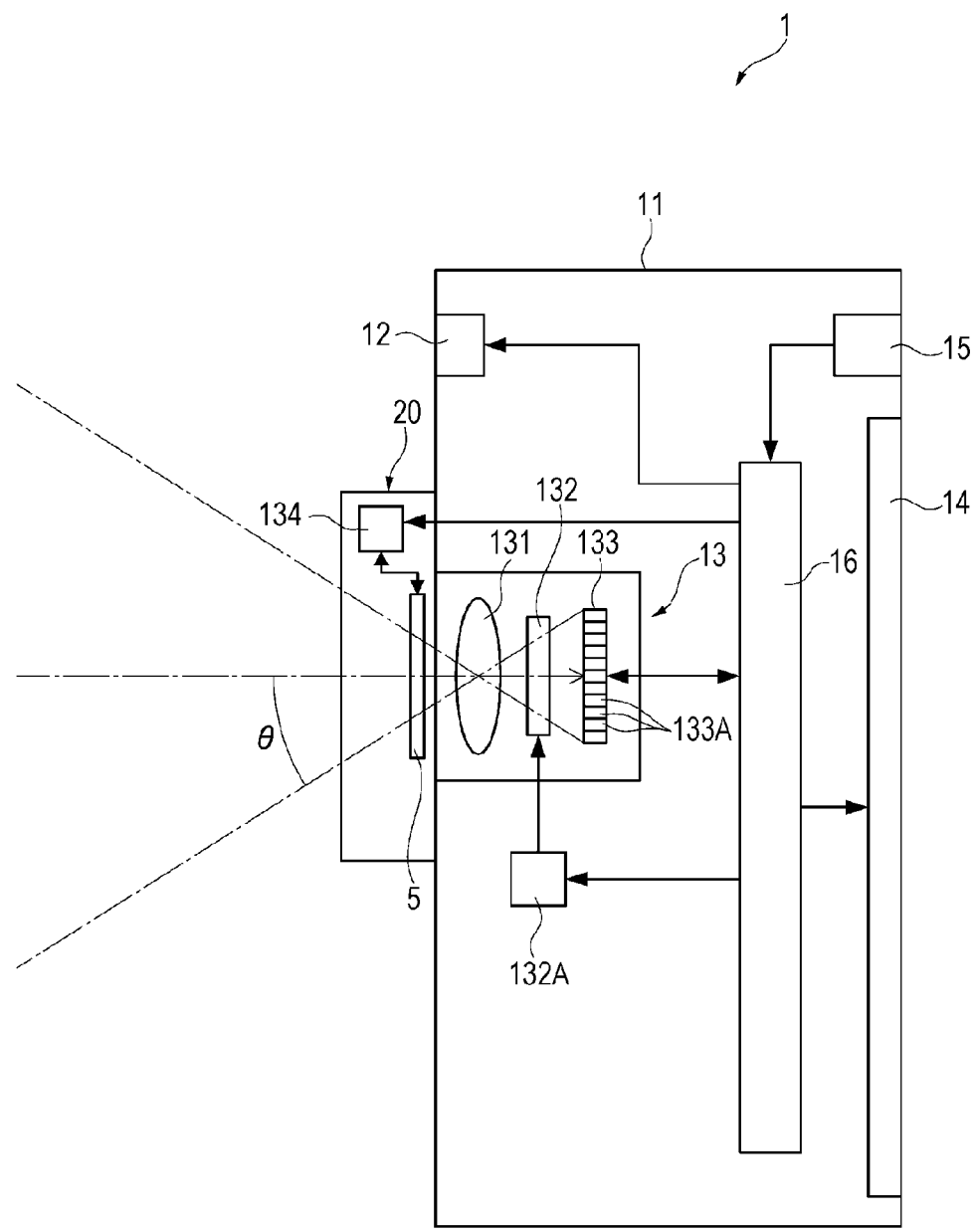
FIG. 21 is a diagram schematically illustrating a spectral imaging apparatus according to other embodiment.

In this case, the incident optical system, such as the telecentric optical system, may not be disposed before the wavelength variable interference filter 5 as illustrated in FIG. 21. In this case, light incident on the wavelength variable interference filter 5 is not perpendicularly incident on the reflection films 54 and 55. However, since center wavelengths of light beams incident on the light receiving elements 133A may be acquired as described above in the invention, a spectral image may be obtained by associating amounts of the received light beams with light reception wavelengths of the received light beams.

Although the wavelength variable interference filter 5 is employed as a spectral filter as an example in the foregoing embodiments, the invention is not limited to this. Any filter may be used as the spectral filter as long as the filter is capable of performing plane spectroscopy, and an AOTF (Acousto-Optic Tunable Filter), an LCTF (Liquid Crystal Tunable Filter), or the like may be used.

Furthermore, although the light-transmission type etalon element which allows light corresponding to the dimension of the gap G1 to be transmitted is used as the wavelength variable interference filter 5 as an example, the invention is not limited to this and a light-reflection type etalon element which reflects light corresponding to the dimension of the gap G1 may be used.

The concrete configurations for embodying the invention may be appropriately changed to other configurations as long as the purposes of the invention are attained.

The entire disclosure of Japanese Patent Application No. 2014-156542 filed on Jul. 31, 2014 is expressly incorporated by reference herein.

What is claimed is:

1. A spectral image acquisition apparatus comprising:
a light source that is configured to emit a reference light having a plurality of wavelengths, light amounts of the reference light being substantially uniform in a plane which intersects with a light axis of the reference light;
a spectral filter that is configured to receive the reference light so as to transmit a transmitted light having of the plurality of wavelengths of the reference light in a predetermined wavelength range, the spectral filter having a pair of reflection films, the pair of reflection films having in-plane variation therebetween;
an image sensor that is configured with a plurality of light receiving elements and that is configured to receive the transmitted light, the image sensor configured to output different signals having different signal values; and
a processor that is configured to acquire a center wavelength of the transmitted light individually incident on each of the plurality of light receiving elements in accordance with the different signal values output from the plurality of light receiving elements,
wherein when each of the plurality of light receiving elements of the image sensor receives each of the plurality of wavelengths of the reference light in the predetermined wavelength range, respectively, the plurality of light receiving elements of the image sensor output the different signals having the different signal values corresponding to different wavelength components of the plurality of wavelengths, and
the different signal values include values corresponding to the in-plane variation of the pair of reflection films.

2. The spectral image acquisition apparatus according to claim 1, further comprising:
a fixed filter that is in an upstream side to the spectral filter, that is disposed on a light path of light incident on the image sensor, and that is configured to have different light transmittances according to the plurality of wavelengths in the predetermined wavelength range.

3. The spectral image acquisition apparatus according to claim 1,
wherein the light source is configured to emit the reference light having the plurality of wavelengths, the plurality of wavelengths have different light amounts depending on the different wavelength components in the predetermined wavelength range.

4. The spectral image acquisition apparatus according to claim 1,
wherein the plurality of light receiving elements in the image sensor have different sensitivities from each other for the different wavelength components.

5. The spectral image acquisition apparatus according to claim 1,
wherein when a wavelength of the transmitted light is changes, a value of the different signal values monotonically changes relative to the wavelength of the transmitted light.

6. The spectral image acquisition apparatus according to claim 5, further comprising:
a fixed filter that is in an upstream side to the spectral filter, that is disposed on a light path of light incident on the image sensor, and that is formed by laminating Ag and $Al_2O_3$ on a glass substrate thereof.

7. The spectral image acquisition apparatus according to claim 1,
wherein the processor is configured to change a wavelength of the transmitted light from the spectral filter,
the processor is configured to generate, in accordance with light amounts of the transmitted light in which the plurality of wavelengths have substantially same wavelengths received by the plurality of light receiving elements, a spectral image corresponding to substantially the same wavelengths, and
wherein the spectral filter is configured to change the wavelength of the transmitted light.

8. The spectral image acquisition apparatus according to claim 7,
wherein the processor is configured to measure spectral spectra of the transmitted light received by the plurality of light receiving elements.

9. The spectral image acquisition apparatus according to claim 8,
wherein the processor is configured to acquire the light amounts of the transmitted light in which the plurality of wavelengths have substantially the same wavelengths received by the plurality of light receiving elements in accordance with the spectral spectra of the transmitted light received by the plurality of light receiving elements, and the processor is configured to generate the spectral image corresponding to substantially the same wavelengths.

10. The spectral image acquisition apparatus according to claim 1,
wherein the processor is configured to acquire incident angles of the transmitted light individually incident on each of the plurality of light receiving elements in accordance with the center wavelength of the transmitted light individually received by each of the plurality of light receiving elements.

11. The spectral image acquisition apparatus according to claim 1,
wherein the spectral filter is a wavelength variable interference filter including a pair of reflection films which face and is spaced apart to each other with an air gap and an actuator that is configured to change a gap distance between the pair of reflection films.

12. A light reception wavelength acquisition method employed in a spectral image acquisition apparatus, the light spectral image acquisition apparatus including:
a light source that is configured to emit a reference light having a plurality of wavelengths, light amounts of the reference light being substantially uniform in a plane which intersects with a light axis of the reference light;
a spectral filter that is configured to receive the reference light so as to transmit a transmitted light having a predetermined wavelength selected from the plurality of wavelengths of the reference light and that is configured to change the predetermined wavelength, the spectral filter having a pair of reflection films, the pair of reflection films having in-plane variation therebetween; and an image sensor that is configured with a plurality of light receiving elements and that is configured to receive the transmitted light which is spectrally dispersed by the spectral filter, the light reception wavelength acquisition method comprising:

causing the image sensor to receive the transmitted light from the spectral filter;

providing a plurality of signals output by the plurality of light receiving elements when the image sensor receives the transmitted light; and acquiring a center wavelength of the transmitted light individually incident on each of the plurality of light receiving elements in accordance with different signal values of the plurality of signals output from the plurality of light receiving elements, wherein when each of the plurality of light receiving elements of the image sensor receives each of the plurality of wavelengths of the reference light in a predetermined wavelength range, respectively, the plurality of light receiving elements of the image sensor output the plurality of signals having the different signal values corresponding to different wavelength components of the plurality of wavelengths, and the different signal values include values corresponding to the in-plane variation of the pair of reflection films.

13. A spectral image acquisition apparatus comprising:

a light source that is configured to emit a reference light having a plurality of wavelengths, light amounts of the reference light being substantially uniform in a plane which intersects with a light axis of the reference light;

a spectral filter that is configured to receive the reference light so as to transmit a transmitted light having of the plurality of wavelengths of the reference light in a predetermined wavelength range, the spectral filter having a pair of reflection films, the pair of reflection films having in-plane variation therebetween;

an image sensor that is configured with a plurality of light receiving elements and that is configured to receive the transmitted light, the image sensor configured to output different signals having different signal values;

a fixed filter that is in an upstream side to the spectral filter, that is disposed on a light path of light incident on the image sensor, and that is configured to have different light transmittances according to the plurality of wavelengths in the predetermined wavelength range; and a processor that is configured to acquire a center wavelength of the transmitted light individually incident on each of the plurality of light receiving elements in accordance with the different signal values output from the plurality of light receiving elements, wherein when each of the plurality of light receiving elements of the image sensor receives each of the plurality of wavelengths of the reference light in the predetermined wavelength range, respectively, the plurality of light receiving elements of the image sensor output the different signals having the different signal values corresponding to different wavelength components of the plurality of wavelengths, the different signal values include values corresponding to the in-plane variation of the pair of reflection films, and wherein when a wavelength of the transmitted light is changes, a value of the different signal values monotonically changes relative to the wavelength of the transmitted light.

* * * * *